US012562867B2

(12) United States Patent
Cha et al.

(10) Patent No.: US 12,562,867 B2
(45) Date of Patent: Feb. 24, 2026

(54) ELECTRONIC DEVICE AND METHOD FOR TRANSMITTING REFERENCE SIGNAL IN ELECTRONIC DEVICE

(71) Applicant: Samsung Electronics Co., Ltd., Suwon-si (KR)

(72) Inventors: Jaemoon Cha, Suwon-si (KR); Kyujae Jang, Suwon-si (KR); Hyeyong Go, Suwon-si (KR); Seongju Lee, Suwon-si (KR); Yeonjoo Lee, Suwon-si (KR); Wonhyung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 17/987,138

(22) Filed: Nov. 15, 2022

(65) Prior Publication Data

US 2023/0085560 A1     Mar. 16, 2023

Related U.S. Application Data

(63) Continuation of application No. PCT/KR2021/006001, filed on May 13, 2021.

(30) Foreign Application Priority Data

May 15, 2020     (KR) ........................ 10-2020-0058619

(51) Int. Cl.
  *H04L 5/00*          (2006.01)
  *H04B 7/0404*          (2017.01)
        (Continued)

(52) U.S. Cl.
  CPC ......... *H04L 5/0051* (2013.01); *H04B 7/0404* (2013.01); *H04W 52/242* (2013.01); *H04W 52/367* (2013.01)

(58) Field of Classification Search
  CPC ..... H04L 5/0051; H04L 5/14; H04L 25/0204; H04L 5/0023; H04L 5/0048;
        (Continued)

(56) References Cited

U.S. PATENT DOCUMENTS

| | | | | |
|---|---|---|---|---|
| 12,088,388 B2 * | 9/2024 | Sun | ...................... | H04B 7/0626 |
| 2009/0316756 A1 * | 12/2009 | Ro | ........................ | H04B 7/069 |

(Continued)

FOREIGN PATENT DOCUMENTS

| | | |
|---|---|---|
| CN | 110166146 A | 8/2019 |
| CN | 110808757 A | 2/2020 |

(Continued)

OTHER PUBLICATIONS

Oppo et al., "Enable gNB to configure downgrading configuration of SRS for antenna switching", 3GPP TSG RAN WG1 Meeting #98bis, Chongqing, China, Oct. 14-20, 2019, R1-1910125, Oct. 4, 2019.

(Continued)

*Primary Examiner* — Lana N Le
(74) *Attorney, Agent, or Firm* — Jefferson IP Law, LLP

(57)          ABSTRACT

An electronic device is provided. The electronic device includes a communication processor, at least one radio frequency integrated circuit (RFIC), a first radio frequency front end (RFFE) circuit, a second FRRE circuit, a first antenna group including a plurality of antennas each connected through the first RFFE circuit to transmit a signal corresponding to at least one communication network, and a second antenna group including a plurality of antennas each connected through the second RFFE circuit to transmit a signal corresponding to at least one communication network, wherein the communication processor is configured to control to transmit a reference signal referenced for channel estimation in a base station of a first communication network (Continued)

to at least one of the plurality of antennas of the first antenna group through the first REEF circuit, and control to transmit the reference signal to at least one of the plurality of antennas of the second antenna group through the second RFFE circuit.

20 Claims, 23 Drawing Sheets

(51) Int. Cl.
H04W 52/24 (2009.01)
H04W 52/36 (2009.01)

(58) Field of Classification Search
CPC . H04L 25/0224; H04B 7/0404; H04B 7/0691; H04B 7/0626; H04B 7/0426; H04B 7/0684; H04B 7/0608; H04B 7/0628; H04B 7/06; H04B 7/0602; H04B 7/04; H04B 1/50; H04B 1/401; H04W 52/242; H04W 52/367; H04W 52/42

See application file for complete search history.

(56) References Cited

U.S. PATENT DOCUMENTS

| | | | |
|---|---|---|---|
| 2010/0285762 A1 | 11/2010 | Ko et al. | |
| 2011/0249581 A1 | 10/2011 | Jen | |
| 2011/0294529 A1* | 12/2011 | Luo | H04L 5/0048 |
| | | | 455/509 |
| 2012/0106489 A1 | 5/2012 | Konishi et al. | |
| 2014/0307570 A1 | 10/2014 | Hong | |
| 2015/0071196 A1 | 3/2015 | Park et al. | |
| 2019/0158244 A1 | 5/2019 | Shin et al. | |
| 2019/0288719 A1 | 9/2019 | Bai | |
| 2019/0326964 A1* | 10/2019 | Li | H04B 7/04 |
| 2019/0335416 A1 | 10/2019 | Kumar et al. | |
| 2019/0349868 A1 | 11/2019 | Zhang et al. | |
| 2020/0127698 A1* | 4/2020 | Cho | H04B 1/0051 |
| 2020/0287684 A1 | 9/2020 | Shin et al. | |
| 2020/0350976 A1* | 11/2020 | Bai | H04B 7/0404 |
| 2021/0218158 A1 | 7/2021 | Kim et al. | |
| 2021/0320697 A1* | 10/2021 | Gopal | H04B 1/38 |
| 2021/0391972 A1* | 12/2021 | Mun | H04L 5/14 |
| 2024/0063962 A1* | 2/2024 | Lin | H04L 5/0048 |
| 2024/0113826 A1* | 4/2024 | Nam | H04B 7/0691 |
| 2025/0175969 A1* | 5/2025 | Kim | H04W 52/367 |

FOREIGN PATENT DOCUMENTS

| | | |
|---|---|---|
| KR | 10-2010-0120256 A | 11/2010 |
| KR | 10-2014-0040858 A | 4/2014 |
| KR | 10-2017-0115870 A | 10/2017 |
| KR | 10-2019-0056929 A | 5/2019 |
| KR | 10-2019-0086332 A | 7/2019 |
| KR | 10-2019-0103414 A | 9/2019 |
| KR | 10-2020-0043735 A | 4/2020 |
| WO | 2020/080888 A1 | 4/2020 |
| WO | WO-2021090369 A1 * | 5/2021 ............. H04L 5/001 |

OTHER PUBLICATIONS

European Search Report dated Nov. 9, 2023, issued in European Application No. 21804714.0.
Korean Office Action dated Jul. 22, 2025, issued in a Korean Patent Application No. 10-2020-0058619.
European Office Action dated Dec. 19, 2025, issued in European Patent Application No. 21804714.0.

* cited by examiner

300a

- - - - CONTROL PLANE

————— USER PLANE

300b

- - - - CONTROL PLANE

————— USER PLANE

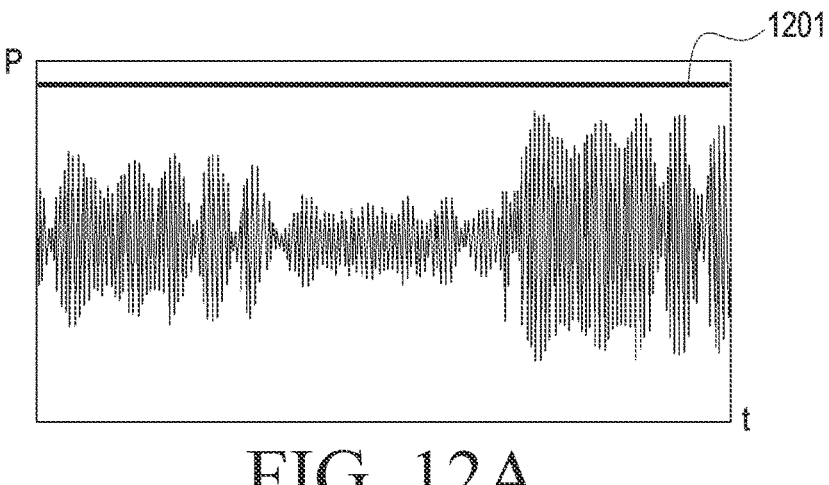
FIG. 12A
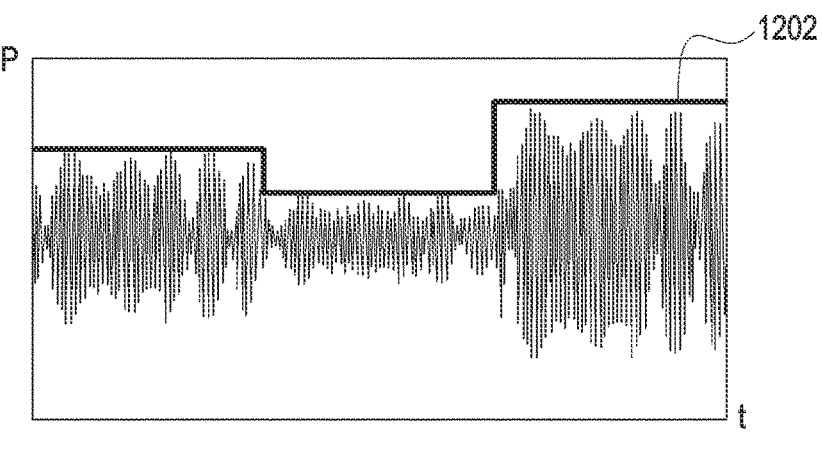
FIG. 12B
FIG. 12C

ELECTRONIC DEVICE AND METHOD FOR TRANSMITTING REFERENCE SIGNAL IN ELECTRONIC DEVICE

CROSS-REFERENCE TO RELATED APPLICATION(S)

This application is a PCT-Bypass Continuation application, claiming priority under § 365(c), of an International application No. PCT/KR2021/006001, filed on May 13, 2021, which is based on and claims the benefit of a Korean patent application number 10-2020-0058619, filed on May 15, 2020, in the Korean Intellectual Property Office, the disclosure of which is incorporated by reference herein in its entirety.

BACKGROUND

1. Field

The disclosure relates to an electronic device and a method of transmitting a reference signal by an electronic device.

2. Description of Related Art

According to the widespread adaptation of portable terminals providing various functions due to the recent development of mobile communication technology, efforts to develop a $5^{th}$ generation (5G) communication system to meet an increasing wireless data traffic demand are being made. The 5G communication system considers implementation in a higher frequency band (for example, millimeter (mm)Wave band or band of 25 to 60 giga hertz (GHz)) in addition to a $3^{rd}$ generation (3G) communication system and a frequency band used for a long-term evolution (LTE) communication system in order to provide a higher data transmission speed so as to achieve a higher data transmission rate.

For example, in the 5G communication system, technologies such as beamforming, massive multiple-input and multiple output (MIMO), full dimensional MIMO (FD-MIMO), an array antenna, analog beam-forming, and a large scale antenna are being discussed to mitigate a propagation path loss in the mmWave band and increase a propagation transmission distance.

In order to implement 5G communication, a standalone (SA) scheme and a non-standalone (NSA) scheme are considered. The SA scheme may be a scheme using only a new radio (NR) system, and the NSA scheme may be a scheme using both the NR system and the existing LTE system. In the NSA scheme, a user terminal may use not only an eNB of the LTE system but also a gNB of the NR system. A technology that allows the user terminal to use different types of communication systems may be named dual connectivity.

The above information is presented as background information only to assist with an understanding of the disclosure. No determination has been made, and no assertion is made, as to whether any of the above might be applicable as prior art with regard to the disclosure.

SUMMARY

In order to transmit a signal to a communication network (for example, a base station) by an electronic device, data generated by a processor or a communication processor within the electronic device may be transmitted to the outside of the electronic device through an antenna after signal processing via a radio frequency integrated circuit (RFIC) and a radio frequency front end (RFFE) circuit (hereinafter, referred to as an "RFFE" for convenience of description).

The electronic device may transmit a reference signal (for example, a sounding reference signal (SRS) referenced for channel estimation by the base station of the communication network to at least one antenna through the RFFE. The base station may perform multi-antenna signal processing or beamforming processing by estimating a channel by the reference signal transmitted from the electronic device. The electronic device may receive the multi-antenna signal-processed or beamforming-processed signal from the base station and thus improve the data reception performance.

For example, the electronic device supporting 1T2R/2T4R includes four antennas but there is a limitation that the reference signal should be transmitted through only two transmission paths. The electronic device supporting 1T4R may not transmit the reference signal with the desired size of power due to a relatively large path loss in some transmission paths.

Aspects of the disclosure are to address at least the above-mentioned problems and/or disadvantages and to provide at least the advantages described below. Accordingly, an aspect of the disclosure is to provide an electronic device capable of operating with 1T4R, the electronic device supporting 1T2R/2T4R, and a method of transmitting a reference signal by an electronic device.

Another aspect of the disclosure is to provide an electronic device capable of transmitting a reference signal through a transmission path having a relatively small path loss among a plurality of transmission paths and a method of transmitting a reference signal by an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication processor, at least one radio frequency integrated circuit (RFIC) connected to the communication processor, a first radio frequency front-end (RFFE) circuit connected to the at least one RFIC and configured to process a transmission signal, a second RFFE circuit connected to the at least one RFIC and configured to process a transmission signal, a first antenna group comprising a plurality of antennas connected through the first RFFE circuit and configured to transmit signals corresponding to at least one communication network, and a second antenna group comprising a plurality of antennas connected through the second RFFE circuit and configured to transmit signals corresponding to at least one communication network, wherein the communication processor is configured to control to transmit a reference signal referenced for channel estimation by a base station of a first communication network to at least one antenna of the plurality of antennas of the first antenna group through the first RFFE circuit and control to transmit the reference signal to at least one antenna of the plurality of antennas of the second antenna group through the second RFFE circuit.

In accordance with another aspect of the disclosure, an electronic device is provided. The electronic device includes a communication processor, at least one radio frequency integrated circuit (RFIC) connected to the communication processor, and a plurality of antennas connected to the at least one RFIC through at least one radio frequency front-end (RFFE) circuit and configured to transmit and receive a signal corresponding to at least one communication network, wherein the communication processor is configured to control to transmit a transmission signal through at least one antenna among the plurality of antennas, based on first maximum transmission power configured for the electronic device, identify, when a reference signal referenced for channel estimation by the base station, second maximum transmission power configured to be larger than the first maximum transmission power for the transmission of the reference signal, and control to transmit the reference signal through at least one antenna among the plurality of antennas, based on the identified second maximum transmission power.

In accordance with another aspect of the disclosure, a method of transmitting a reference signal by an electronic device comprises: transmitting a reference signal referenced for channel estimation by a base station of a first communication network to at least one antenna of a plurality of antennas of a first antenna group through a first RFFE circuit, wherein the electronic device comprises a communication processor, at least one radio frequency integrated circuit (RFIC) connected to the communication processor, the first radio frequency front-end (RFFE) circuit connected to the at least one RFIC and configured to process a transmission signal, a second RFFE circuit connected to the at least one RFIC and configured to process a transmission signal, the first antenna group comprising the plurality of antennas connected through the first RFFE circuit and configured to transmit signals corresponding to at least one communication network, and a second antenna group comprising a plurality of antennas connected through the second RFFE circuit and configured to transmit signals corresponding to at least one communication network; and transmitting the reference signal to at least one antenna of the plurality of antennas of the second antenna group through the second RFFE circuit.

In accordance with another aspect of the disclosure, a method of transmitting a reference signal by an electronic device comprises: transmitting a transmission signal through at least one antenna among a plurality of antennas, based on first maximum transmission power configured for the electronic device, wherein the electronic device comprising at least one radio frequency integrated circuit (RFIC) connected to a communication processor and the plurality of antennas connected to the at least one RFIC through at least one radio frequency front-end (RFFE) circuit and configured to transmit and receive a signal corresponding to at least one communication network; identifying, when a reference signal referenced for channel estimation by the base station, second maximum transmission power configured to be larger than the first maximum transmission power for the transmission of the reference signal; and transmitting the reference signal through at least one antenna among the plurality of antennas, based on the identified second maximum transmission power.

According to various embodiments, when an electronic device transmits a reference signal (for example, a sounding reference signal (SRS), a terminal which supports 1T2R/2T4R but does not support 1T4R may operate with 1T4R.

According to various embodiments, when the electronic device transmits a reference signal, the reference signal may be transmitted through a transmission path having a relatively small path loss among a plurality of transmission paths.

According to various embodiments, when the electronic device transmits a reference signal, the reference signal may be transmitted with higher power through transmission based on maximum transmission power higher than maximum transmission power referenced for normal data transmission.

According to various embodiments, as the electronic device transmits reference signals through the larger number of transmission paths or transmits reference signal through higher transmission power, it is possible to more accurately identify a channel environment between a plurality of different antennas of the electronic device and a base station to perform beamforming and, accordingly, improve the performance of downlink data transmission.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A, 12B, and 12C illustrate a method of controlling transmission power of a reference signal according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
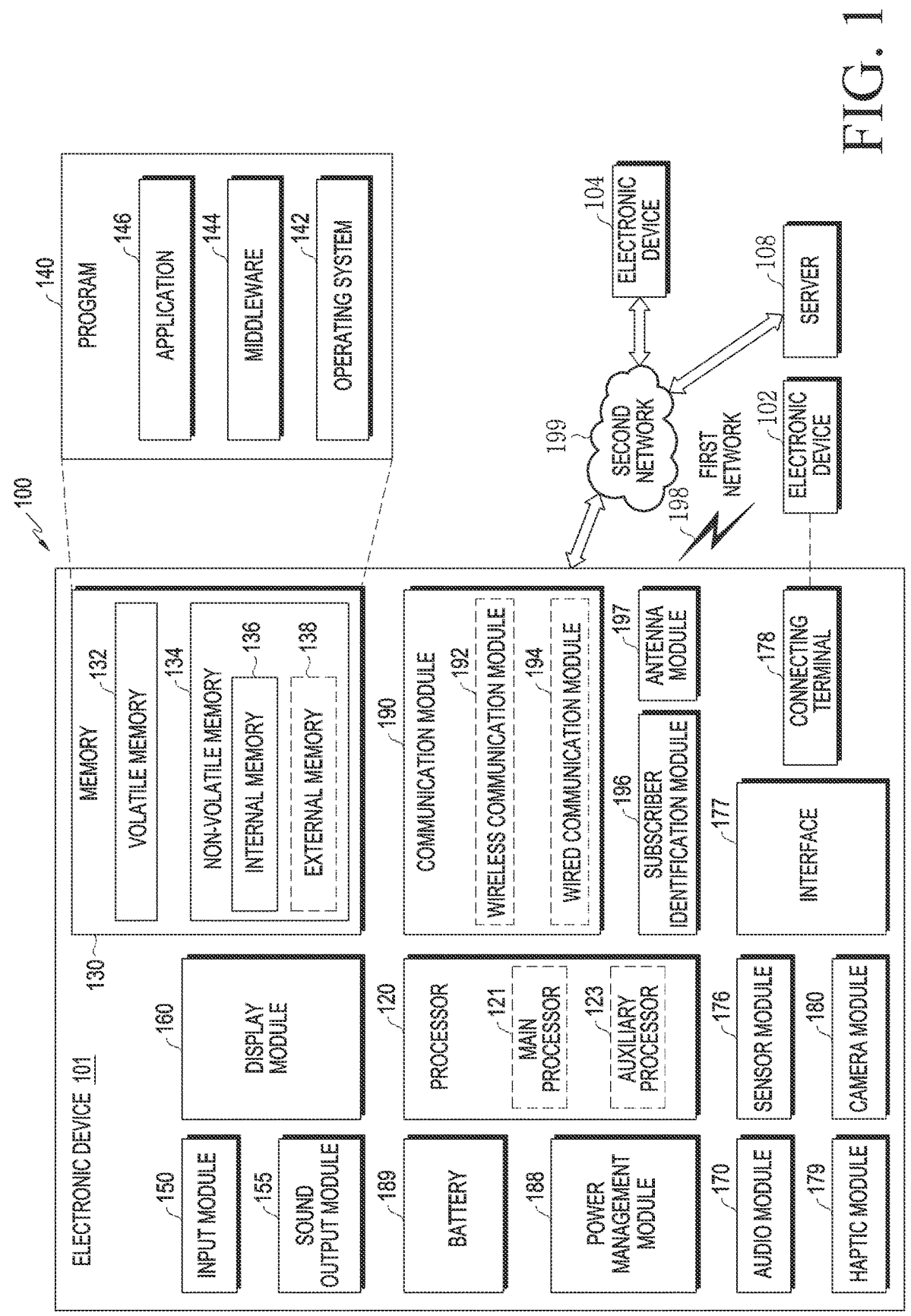
FIG. 1 is a block diagram illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
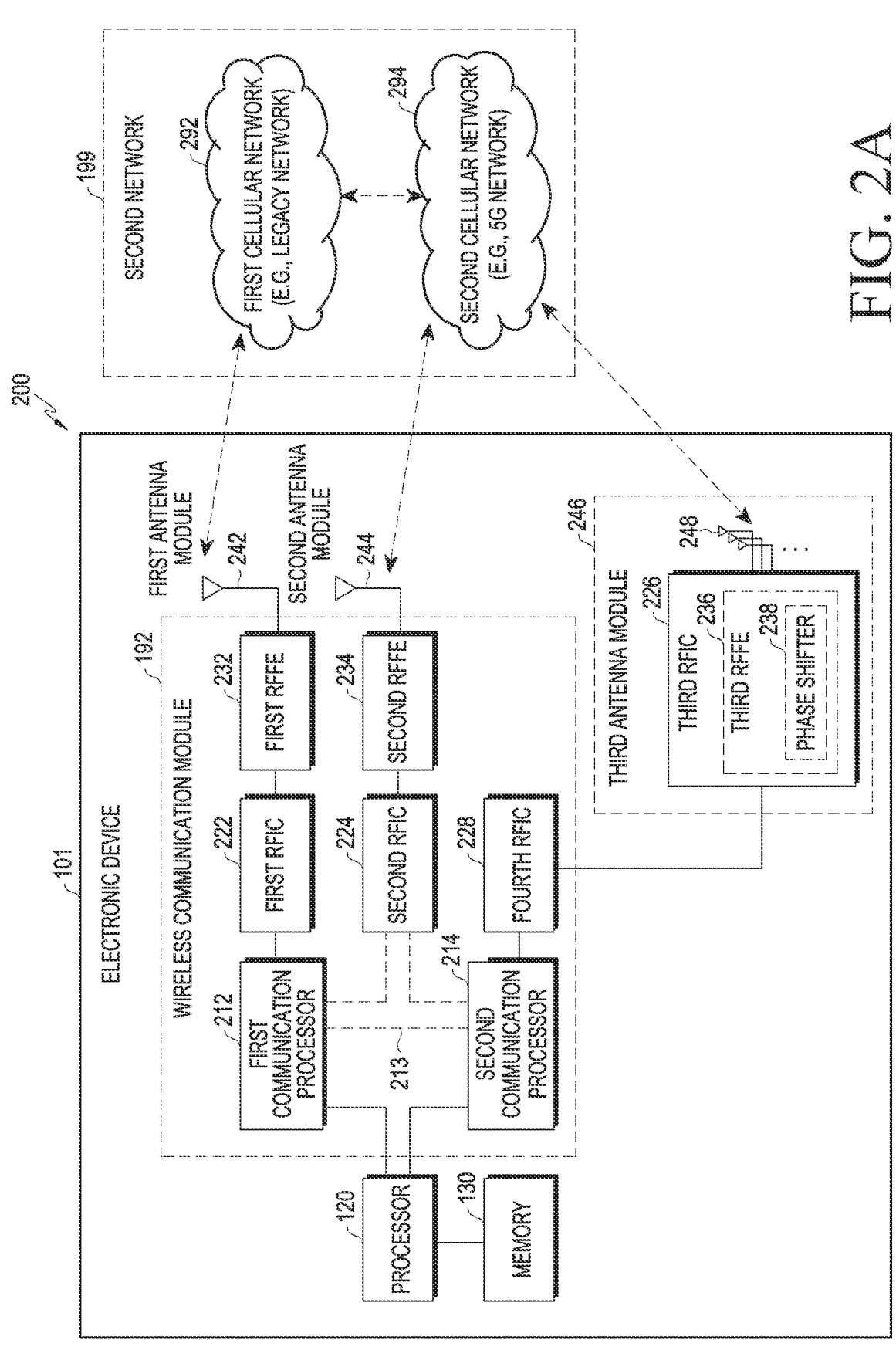
FIG. 2A is a block diagram of an electronic device for supporting legacy network communication and 5G network communication according to an embodiment of the disclosure.

FIG. 2A is a block diagram 200 of the electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor 120 and the memory 130. A second network 199 may include a first cellular network 292 and a second cellular network 294. According to another embodiment, the electronic device 101 may further include at least one of the elements illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a portion of the wireless communication module 192. According to another embodiment, the fourth RFIC 228 may be omitted or may be included as a part of the third RFIC 226.

The first communication processor 212 may support establishment of a communication channel in a band to be used for wireless communication with the first cellular network 292 and legacy network communication through the established communication channel According to various embodiments, the first cellular network may be a legacy network including a second generation (2G), 3G, 4G, or long term evolution (LTE) network. The second communication processor 214 may support establishment of a communication channel corresponding to a predetermined band (for example, about 6 GHz to about 60 GHz) among bands to be used for wireless communication with the second network 294 and 5G network communication through the established communication channel. According to various embodiments, the second cellular network 294 may be a 5G network defined in the $3^{rd}$ generation partnership project (3GPP). In addition, according to an embodiment, the first communication processor 212 or the second communication processor 214 may support establishment of a communication channel corresponding to another predetermined band (for example, equal to or lower than about 6 GHz) among bands to be used for wireless communication with the second network 294 and 5G network communication through the established communication channel.

The first communication processor 212 may transmit and receive data to and from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an interface 213 between processors. The inter-processor interface 213 may be implemented as, for example, a universal asynchronous receiver/transmitter (UART) (for example, a high speed-UART (HS-UART) or a peripheral component interconnect bus express (PCIe) interface), but there is no limitation therein. Alternatively, the first communication processor 212 and the second communication processor 214 may exchange control information and packet data information through, for example, a shared memory. The first communication processor 212 may transmit and receive various pieces of information such as sensing information, information on an output intensity, and Resource Block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

According to an embodiment, the first communication processor 212 and the second communication processor 214 may be implemented within a single chip or a single package. According to various embodiments, the first communication processor 212 or the second communication processor 214 may be configured with the processor 120, the auxiliary processor 123, or the communication module 190 within a single chip or a single package.

Figure 2B:
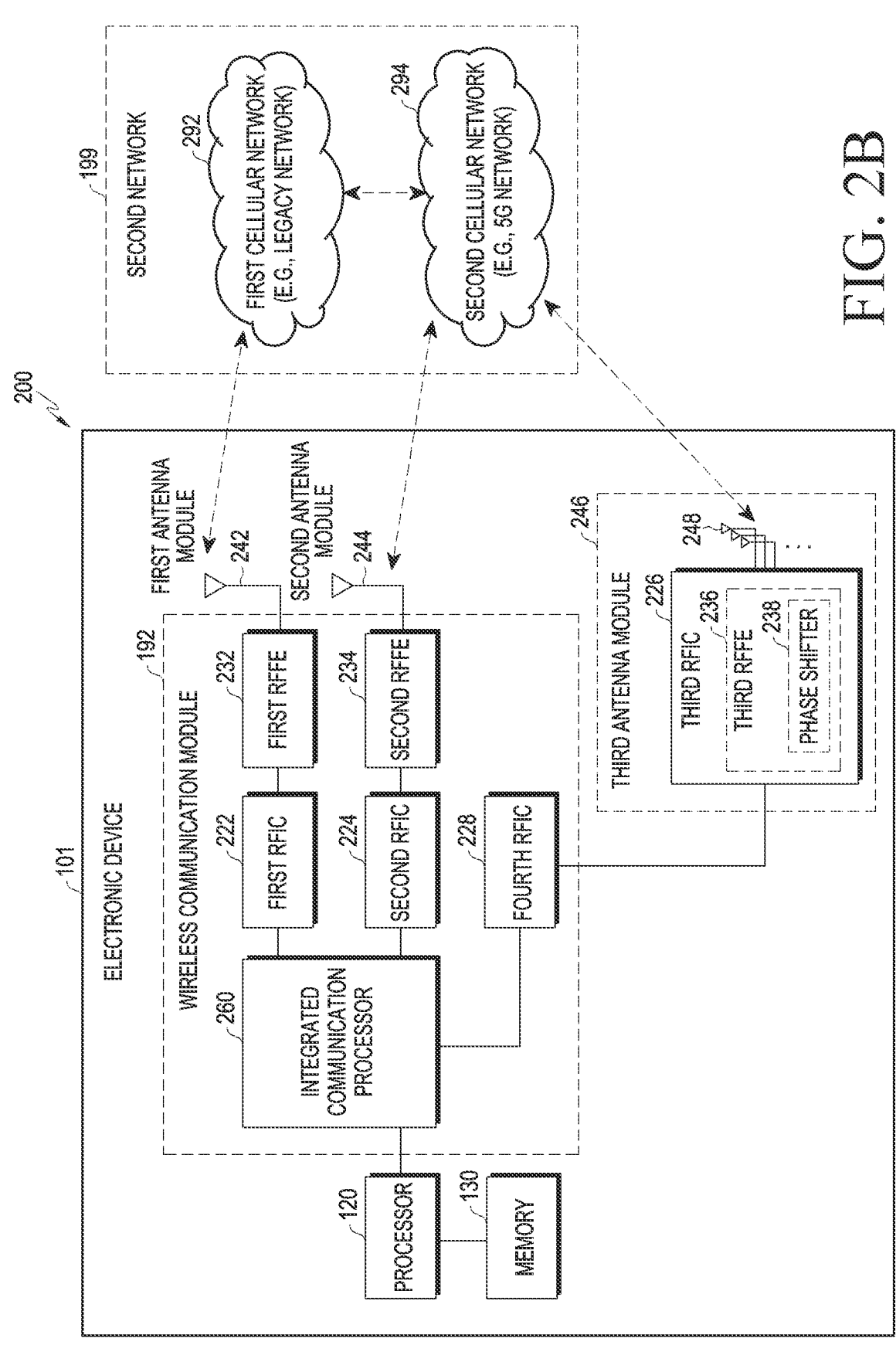
FIG. 2B is a block diagram of the electronic device for supporting legacy network communication and 5G network communication according to an embodiment of the disclosure.

FIG. 2B is a block diagram of the electronic device for supporting legacy network communication and 5G network communication according to an embodiment of the disclosure.

Referring to FIG. 2B, an integrated communication processor 260 may support all functions for communication with the first cellular network 292 and the second cellular network 294.

In transmission, the first RFIC 222 may convert a baseband signal generated by the first communication processor 212 into a radio frequency (RF) signal of about 700 MHz to about 3 GHz used for the first network 292 (for example, legacy network). In reception, the RF signal may be acquired from the first network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second network 294 (for example, 5G network). In reception, a 5G Above6 RF signal may be acquired from the second network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

The electronic device 101 may include the fourth RFIC 228 separately from the third RFIC 226 or as a part thereof according to an embodiment. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal to be processed by the second communication processor 214.

Figure 2C:
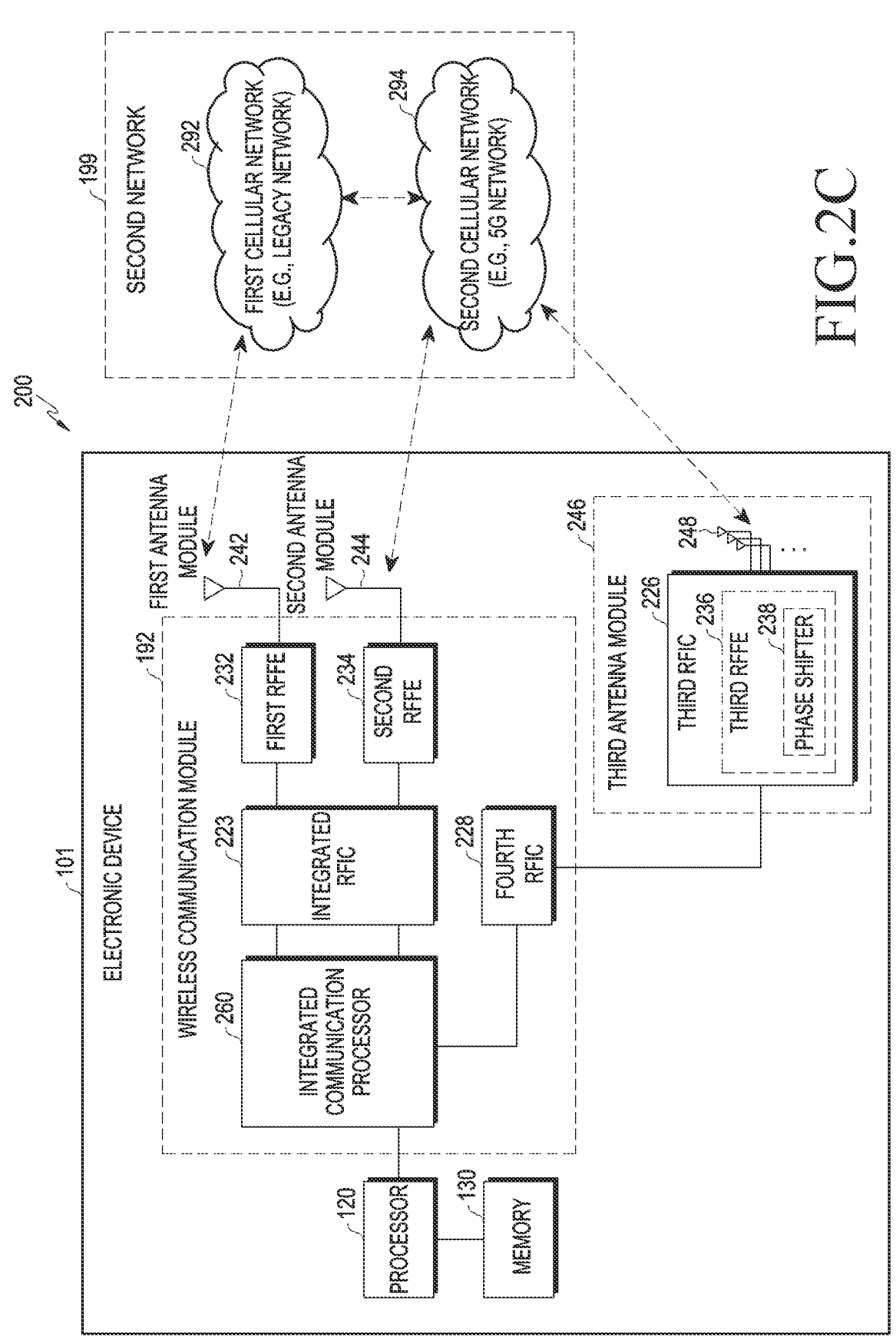
FIG. 2C is a block diagram of the electronic device supporting legacy network communication and 5G network communication according to an embodiment of the disclosure.

FIG. 2C is a block diagram of the electronic device supporting legacy network communication and 5G network communication according to an embodiment of the disclosure.

According to an embodiment, the first RFIC 222 and the second RFIC 224 may be implemented as at least a portion of a single chip or a single package. According to various embodiments, when the first RFIC 222 and the second RFIC 224 are implemented as a single chip or a single package in FIG. 2A or 2B, they may be implemented as an integrated RFIC 223 as illustrated in FIG. 2C. In this case, the integrated RFIC 223 may be connected to the first RFFE 232 and the second RFFE 234 to convert a baseband signal into a signal in a band supported by the first RFFE 232 and/or the second RFFE 234 and transmit the converted signal into one of the first RFFE 232 and the second RFFE 234. According to an embodiment, the first RFFE 232 and the second RFFE 234 may be implemented as at least a portion of a single chip or a single package. According to an embodiment, at least one antenna module of the first antenna module 242 or the second antenna module 244 may be omitted or may be combined with another antenna module to process RF signals in a plurality of corresponding bands.

According to an embodiment, the third RFIC 226 and the antenna 248 may be disposed on the same substrate to configure the third antenna module 246. For example, the wireless communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may increase a quality or a speed of communication with the second network 294 (for example, 5G network).

According to an embodiment, the antennas 248 may be configured as an antenna array including a plurality of antenna elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device 101 (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G network) may operate independently from the first cellular network 292 (for example, legacy network) (for example, stand-alone (SA)) or operate through a connection to thereto (for example, non-standalone (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first communication processor 212, or the second communication processor 214).

Figure 3A:
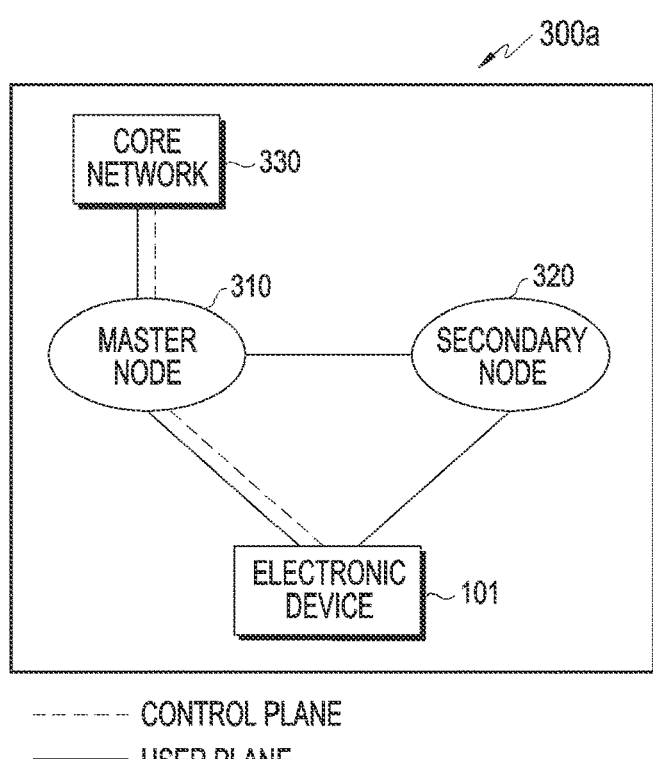
FIG. 3A is a diagram illustrating wireless communication systems providing a network of legacy communication and/or 5G communication according to an embodiment of the disclosure.
Figure 3B:
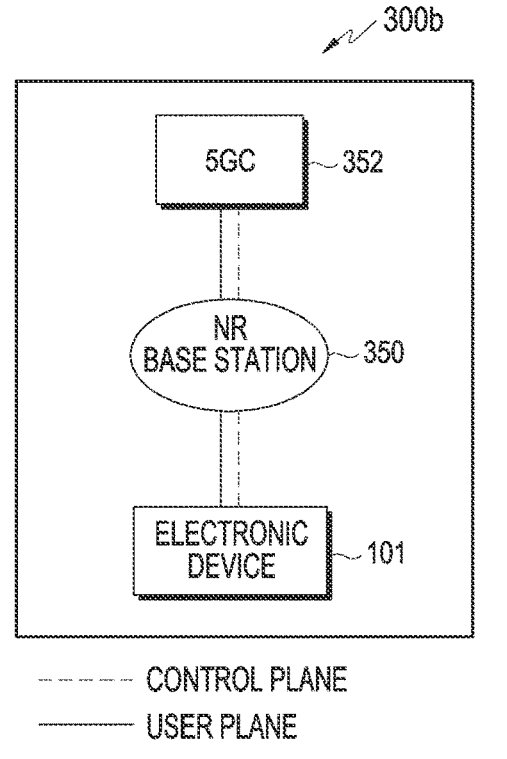
FIG. 3B is a diagram illustrating wireless communication systems providing a network of legacy communication and/or 5G communication according to an embodiment of the disclosure.
Figure 3C:
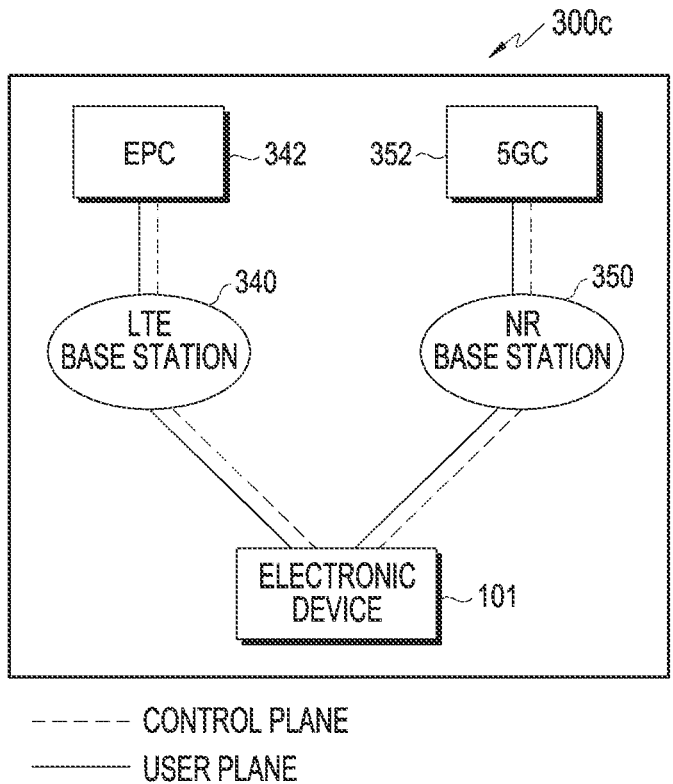
FIG. 3C is a diagram illustrating wireless communication systems providing a network of legacy communication and/or 5G communication according to an embodiment of the disclosure.

FIGS. 3A, 3B, and 3C are diagrams illustrating wireless communication systems that provide the network of legacy communication and/or 5G communication according to various embodiments of the disclosure.

Referring to FIGS. 3A, 3B, and 3C, network environments 300a, 300b, and 300c may include at least one of the legacy network and the 5G network. The legacy network may include, for example, a 4G or LTE eNB 340 (for example, an eNodeB (eNB)) of the 3GPP standard supporting radio access with the electronic device 101 and an evolved packet core (EPC) 342 for managing 4G communication. The 5G network may include, for example, a New Radio (NR) base station 350 (for example, a gNodeB (gNB)) supporting radio access with the electronic device 101 and a 5$^{th}$ Generation Core (5GC) 352 for managing 5G communication of the electronic device 101.

According to various embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 330 (for example, the EPC 342).

FIG. 3A is a diagram illustrating wireless communication systems providing a network of legacy communication and/or 5G communication according to an embodiment of the disclosure.

Referring to FIG. 3A, the electronic device 101 according to an embodiment may transmit and receive at least one of a control message or user data to and from at least some of the 5G network (for example, the NR gNB 350 and the 5GC 352) using at least some of the legacy network (for example, the LTE eNB 340 and the EPC 342).

According to various embodiments, the network environment 300a may include a network environment for providing wireless communication Dual Connectivity (DC) to the LTE eNB 340 and the NR gNB 350 and transmitting and receiving a control message to and from the electronic device 101 through one core network 230 of the EPC 342 or the 5GC 352.

According to various embodiments, in the DC environment, one of the LTE eNB 340 or the NR gNB 350 may operate as a Master Node (MN) 310, and the other may operate as a Secondary Node (SN) 320. The MN 310 may be connected to the core network 230 and transmit and receive a control message. The MN 310 and the SN 320 may be connected through a network interface and may transmit and receive a message related to management of radio resources (for example, communication channels) to and from each other.

According to various embodiments, the MN 310 may include the LTE eNB 340, the SN 320 may include the NR gNB 350, and the core network 330 may include the EPC 342. For example, the control message may be transmitted and received through the LTE gNB 340 and the EPC 342, and the user data may be transmitted and received through at least one of the LTE eNB 340 or the NR gNB 350.

According to various embodiments, the MN 310 may include the NR gNB 350, the SN 320 may include the LTE eNB 340, and the core network 330 may include the 5GC 352. For example, the control message may be transmitted and received through the NR gNB 350 and the 5GC 352, and the user data may be transmitted and received through at least one of the LTE eNB 340 or the NR gNB 350.

FIG. 3B is a diagram illustrating wireless communication systems providing a network of legacy communication and/or 5G communication according to an embodiment of the disclosure.

Referring to FIG. 3B, according to various embodiments, the 5G network may include the NR gNB 350 and the 5GC 352 and may independently transmit and receive the control message and the user data to and from the electronic device 101.

FIG. 3C is a diagram illustrating wireless communication systems providing a network of legacy communication and/or 5G communication according to an embodiment of the disclosure.

Referring to FIG. 3C, the legacy network and the 5G network according to various embodiments may independently transmit and receive data. For example, the electronic device 101 and the EPC 342 may transmit and receive a control message and user data through the LTE eNB 340. In another example, the electronic device 101 and the 5GC 352 may transmit and receive a control message and user data through the NR gNB 350.

According to various embodiments, the electronic device 101 may be registered in at least one of the EPC 342 or the 5GC 352 and transmit and receive a control message.

According to various embodiments, the EPC 342 or the 5GC 352 may interwork and manage communication of the electronic device 101. For example, movement information of the electronic device 101 may be transmitted and received through an interface between the EPC 342 and the 5GC 352.

As described above, the dual connection through the LTE eNB 340 and the NR gNB 350 may be also named E-UTRA new radio dual connectivity (EN-DC).

Hereinafter, the structure of the electronic device 101 according to various embodiments is described in detail with reference to FIGS. 4A, 4B, 4C, 5A, 5B, 6, 7, 8A, 8B, 9, and 10. Although it is illustrated that one communication processor 260 and one RFIC 410 are connected to a plurality of RFFEs 431 and 432 in the drawings of the following embodiments, various embodiments described below are not limited thereto. For example, in various embodiments described below, the plurality of communication processors 212 and 214 and/or the plurality of RFICs 222, 224, 226, and 228 may be connected to the plurality of RFFEs 431 and 432 as illustrated in FIG. 2A or 2B.

Figure 4A:
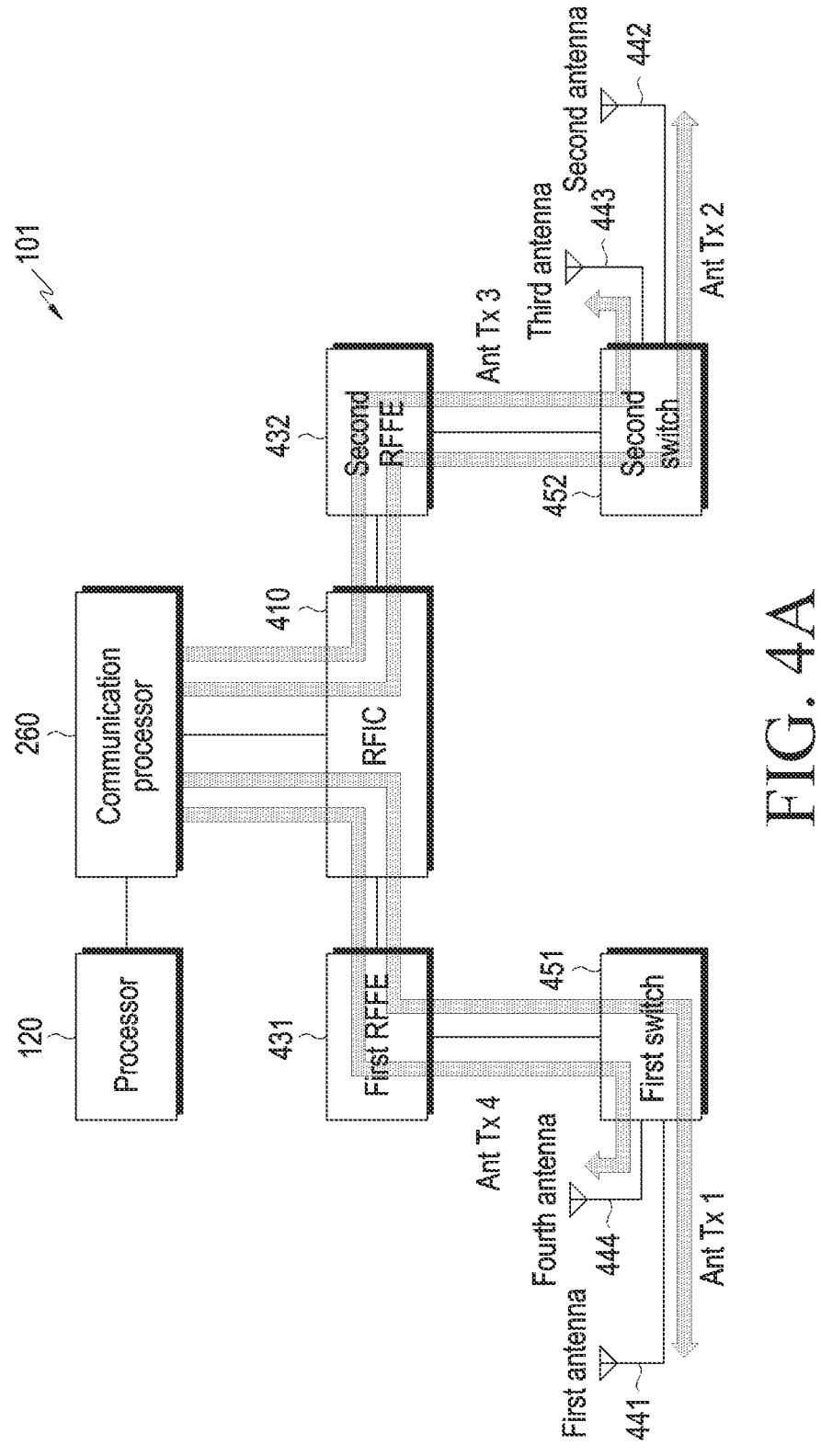
FIG. 4A is a block diagram illustrating the electronic device according to an embodiment of the disclosure.
Figure 4B:
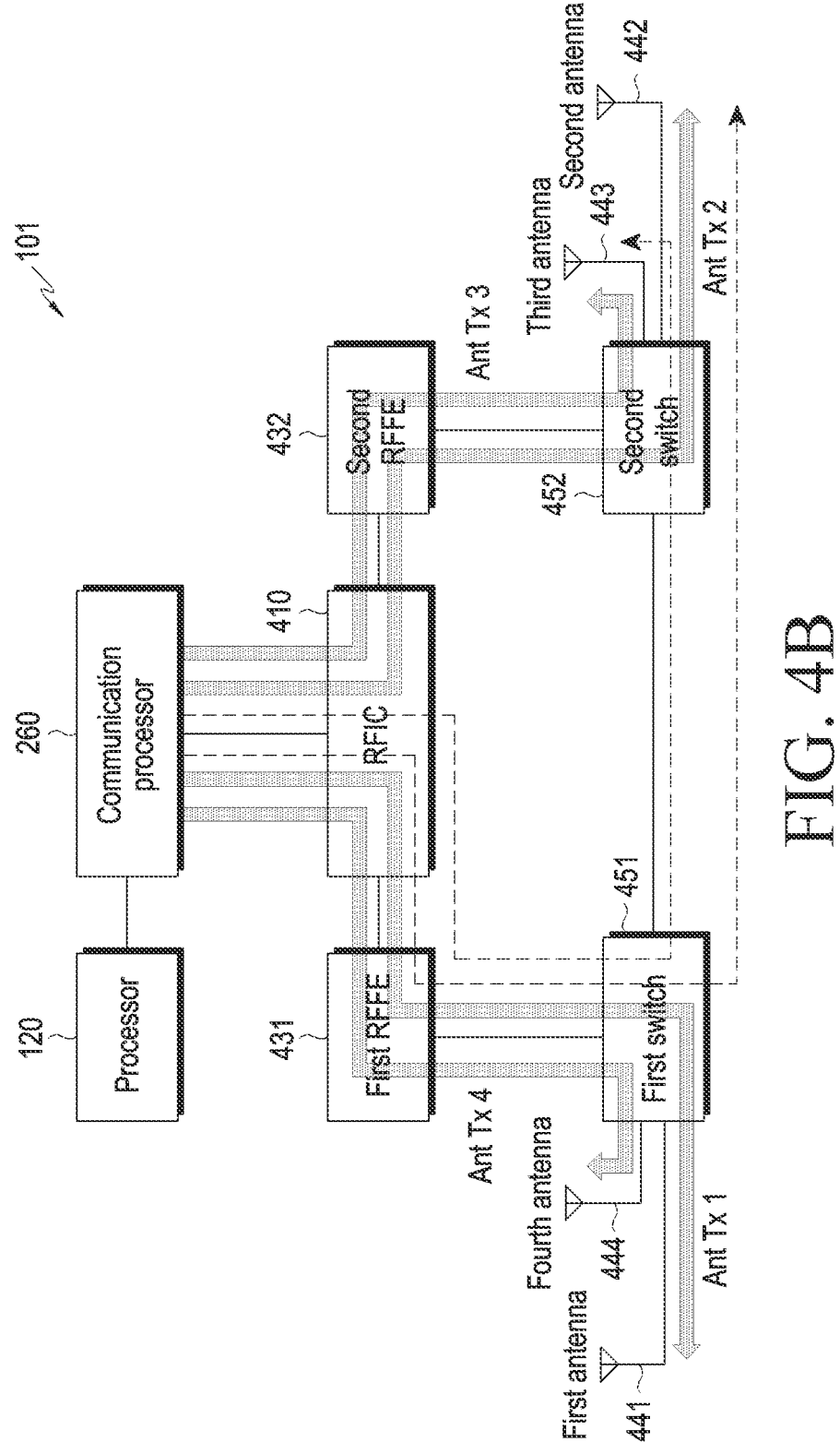
FIG. 4B is a block diagram illustrating the electronic device according to an embodiment of the disclosure.

FIGS. 4A and 4B are block diagrams of the electronic device according to various embodiments of the disclosure.

Referring to FIG. 4A, the electronic device (for example, the electronic device 101 of FIG. 1) according to various embodiments may include the processor 120, the communication processor 260, an RFIC 410, a first RFFE 431, a second RFFE 432, a first antenna 441, a second antenna 442, a third antenna 443, a fourth antenna 444, a first switch 451, or a second switch 452. For example, the first RFFE 431 may be disposed on the upper part within the housing of the electronic device 101, and the second RFFE 432 may be disposed on the lower part than the first RFFE 431 within the housing of the electronic device 101, but various embodiments of the disclosure are not limited to the disposition location.

According to various embodiments, in transmission, the RFIC 410 may convert a baseband signal generated by the communication processor 260 into a radio frequency (RF) signal used for the first communication network or the second communication network. For example, the RFIC 410 may transmit the RF signal used for the first communication network to the first antenna 441 or the fourth antenna 444 through the first RFFE 431 and the first switch 451. The RFIC 410 may transmit the RF signal used for the first communication network or the second communication network to the second antenna 442 or the third antenna 443 through the second RFFE 432 and the second switch 452. According to various embodiments, the RFIC 410 may transmit the RF signal corresponding to the first communication network (for example, NR) to the first antenna 441 or the fourth antenna 444 through the first RFFE 431 and transmit the RF signal corresponding to the second communication network (for example, LTE) to the second antenna 442 or the third antenna 443 through the second RFFE 432. According to another embodiment, the RFIC 410 may transmit the RF signal corresponding to the first communication network (for example, NR) or the second communication network (for example, LTE) to the first antenna 441 or the fourth antenna 444 through the first RFFE 431 and transmit the same RF signal corresponding to the second communication network (for example, LTE) or the second communication network (for example, LTE) to the second antenna 442 or the third antenna 443 through the second RFFE 432, so as to operate as a multi-input multi-output (MIMO) antenna.

According to various embodiments, a transmission path from the RFIC 410 to the first antenna 441 via the first RFFE 431 and the first switch 451 may be referred to as a 'first antenna transmission path (Ant Tx1)'. A transmission path from the RFIC 410 to the fourth antenna 444 via the first RFFE 431 and the first switch 451 may be referred to as a 'fourth antenna transmission path (Ant Tx4)'.

According to various embodiments, in transmission, the RFIC 410 may convert a baseband signal generated by the communication processor 260 into a radio frequency (RF) signal used for the first communication network or the second communication network. For example, the RFIC 410 may transmit the RF signal used for the first communication network or the second communication network to the second antenna 442 or the third antenna 443 through the second RFFE 432 and the second switch 451.

According to various embodiments, a transmission path from the RFIC 410 to the second antenna 442 via the second RFFE 432 and the second switch 452 may be referred to as a 'second antenna transmission path (Ant Tx2)'. A transmission path from the RFIC 410 to the third antenna 443 via the second RFFE 432 and the second switch 452 may be referred to as a 'third antenna transmission path (Ant Tx3)'.

According to various embodiments, in reception, the RF signal may be received from the first communication network through the first antenna 441 or the fourth antenna 444, and the received RF signal may be transmitted to the communication processor 260 via at least one RFIC. Further, the RF signal may be received from the first communication network or the second communication network through the second antenna 442 or the third antenna 443, and the received RF signal may be transmitted to the communication processor 260 via at least one RFIC.

According to various embodiments, the first communication network and the second communication network may be different communication networks. For example, the first communication network may be a 5G network, and the second communication network may be a legacy network (for example, an LTE network). When the first communication network is the 5G network, the first RFFE 431 may be designed to be suitable for processing a signal corresponding to the 5G network and the second RFFE 432 may be designed to be suitable for processing a signal corresponding to the legacy network.

According to various embodiments, a frequency band of the signal transmitted through the first RFFE 431 and a frequency band of the signal transmitted through the second RFFE 432 may be the same as, similar to, or different from each other. For example, the frequency band of the signal transmitted through the first RFFE 431 may be an N41 band (2.6 GHz) which is a frequency band of the 5G network, and the frequency band of the signal transmitted through the second RFFE 432 may be a B41 band (2.6 GHz) which is a frequency band of the LTE network. In this case, the first RFFE 431 and the second RFFE 432 process the same or similar frequency band signals, but the first RFFE 431 may be designed to process a signal suitable for a characteristic of the 5G network and the second RFFE 432 may be designed to process a signal suitable for a characteristic of the LTE network.

According to various embodiments, when the electronic device transmits a signal through one of the first antenna 441 and the fourth antenna 444 via the first RFFE 431 and the first switch 451 and transmits a reference signal through the first antenna 441 and the fourth antenna 444, one transmission antenna (Tx) and two reception antennas (Rx) are used, which may be referred to as '1T2R'. The first antenna 441 and the fourth antenna 444 may be referred to as a 'first antenna group' for convenience.

According to various embodiments, when the electronic device transmits a signal through one of the second antenna 442 and the third antenna 443 via the second RFFE 432 and the second switch 452 and transmits a reference signal through the second antenna 442 and the third antenna 443, one transmission antenna (Tx) and two reception antennas (Rx) are used, which may be referred to as '1T2R'. The second antenna 442 and the third antenna 443 may be referred to as a 'second antenna group' for convenience.

According to various embodiments, when the electronic device simultaneously transmits and receives data through the first RFFE 431 and the second RFFE 432, two transmission antennas (Tx) and four reception antennas (Rx) are used, which may be referred to as '2T4R'. The electronic device illustrated in FIG. 4A can operate with 1T2R or 2T4R according to various embodiments, and thus may be referred to as an electronic device supporting '1T2R/2T4R'.

According to various embodiments, the communication processor 260 may perform control to transmit a reference signal (for example, a sounding reference signal (SRS)) referenced for channel estimation by a base station of the first communication network to at least one antenna (the first antenna 441 or the fourth antenna 444) among a plurality of antennas of the first antenna group through the first RFFE circuit 431. According to various embodiments, the communication processor 260 may further perform control to transmit the reference signal referenced for channel estimation by the base station of the first communication network to at least one antenna (the second antenna 442 or the third antenna 443) among the plurality of antennas of the second antenna group through the second RFFE circuit 432. When the electronic device transmits the reference signal through the first antenna 441, the second antenna 442, the third antenna 443, or the fourth antenna 444, the base station of the first communication network may receive the reference signal and perform channel estimation through the received reference signal. The base station of the first communication network may transmit a signal beamformed for the first antenna 441, the second antenna 442, the third antenna 443, or the fourth antenna 444. The electronic device may receive the signal transmitted from the base station of the first communication network through the first antenna 441, the second antenna 442, the third antenna 443, or the fourth antenna 444. The electronic device illustrated in FIG. 4A may be designed as an electronic device supporting '1T2R/2T4R' but may transmit the reference signal to the base station of the first communication network through the first antenna 441, the second antenna 442, the third antenna 443, or the fourth antenna 444, and thus can operate with '1T4R'. According to various embodiments, when the electronic device operates with 1T4R as described above even though the electronic device is designed as the device supporting 1T2R/2T4R, throughput of the received signal may be improved compared to the operation with 1T2R.

According to various embodiments, FIG. 4A illustrates that one RFIC 410 is connected to two RFFEs 431 and 432 and transmits a reference signal (for example, an SRS), but the embodiments may be applied to various forms of structures (for example, the structure illustrated in FIG. 10) in which at least one RFIC is connected to three or more RFFEs and each RFFE is connected to at least one antenna.

Referring to FIG. 4B, the electronic device (for example, the electronic device 101 of FIG. 1) according to various embodiments may include the processor 120, the communication processor 260, the RFIC 410, the first RFFE 431, the second RFFE 432, the first antenna 441, the second antenna 442, the third antenna 443, the fourth antenna 444, the first switch 451, or the second switch 452. For example, the first RFFE 431 may be disposed on the upper part within the housing of the electronic device 101, and the second RFFE 432 may be disposed on the lower part than the first RFFE 431 within the housing of the electronic device 101, but various embodiments of the disclosure are not limited to the disposition location. In the embodiment of FIG. 4B described below, the description that can be applied in common with FIG. 4A is omitted.

According to various embodiments, in transmission, the RFIC 410 may convert a baseband signal generated by the communication processor 260 into a radio frequency (RF) signal used for the first communication network or the second communication network. For example, the RFIC 410 may transmit the RF signal used for the first communication network to the first antenna 441 or the fourth antenna 444 through the first RFFE 431 and the first switch 451. The first RFIC 410 may transmit the RF signal used for the first communication network to the second antenna 442 or the third antenna 443 through the first RFFE 431, the first switch 451, and the second switch 452. When the RF signal used for the first communication network is transmitted to the second antenna 442 or the third antenna 443 through the first RFFE 431, the first switch 451, and the second switch 452, a transmission path becomes longer and the transmission additionally passes through the switch as illustrated in FIG. 9, and thus a relatively larger path loss may be generated. According to various embodiments, when the electronic device 101 desires to transmit the reference signal (for example, the SRS) to the second antenna 442 and/or the third antenna 443 through the RFIC 410, the electronic device 101 may reduce the path loss by performing control to transmit the reference signal through the second RFFE 432 and the second switch 452 without transmitting the reference signal through the first RFFE 431, the first switch 451, and the second switch 452. Detailed description thereof is made in detail with reference to FIGS. 8B and 9.

FIG. 9 is a block diagram illustrating the structure of the electronic device according to an embodiment of the disclosure.

According to various embodiments, the RFIC 410 may transmit the RF signal corresponding to the first communication network (for example, NR) to the first antenna 441 or the fourth antenna 444 through the first RFFE 431 and the RF signal corresponding to the second communication network (for example, LTE) to the second antenna 442 or the third antenna 443 through the second RFFE 432. According to various embodiments, the RFIC 410 may transmit the RF signal corresponding to the first communication network (for example, NR) or the second communication network (for example, LTE) to the first antenna 441 or the fourth antenna 444 through the first RFFE 431 and the first switch 451 and transmit the RF signal to the second antenna 442 or the third antenna 443 through the first RFFE 431, the first switch 451, and the second RFFE 452, so as to operate as a multi-input multi-output (MIMO) antenna. According to various embodiments, a transmission path from the RFIC 410 to the first antenna 441 via the first RFFE 431 and the first switch 451 may be referred to as a 'first antenna transmission path (Ant Tx1)'. A transmission path from the RFIC 410 to the fourth antenna 444 via the first RFFE 431 and the first switch 451 may be referred to as a 'fourth antenna transmission path (Ant Tx4)'. A transmission path from the RFIC 410 to the second antenna 442 via the first RFFE 431, the first switch 451, and the second switch 452 may be referred to as a 'second antenna transmission path (Ant Tx2)'. A transmission path from the RFIC 410 to the third antenna 443 via the first RFFE 431, the first switch 451, and the second switch 452 may be referred to as a 'third antenna transmission path (Ant Tx3)'.

According to various embodiments, a relatively larger path loss may be generated due to the length of the transmission path along with the transmission signal is transmitted from the RFIC 410 to the third antenna 443 or the fourth antenna 444 via the first RFFE 431, the first switch 451, and the second switch 452 and elements (for example, switches) disposed on the corresponding transmission path. According to various embodiments, the electronic device 101 (for example, the communication processor 260) may reduce the path loss by changing the second antenna transmission path and/or the third antenna transmission path to pass through the second RFFE 432 and the second switch 452.

According to various embodiments, in reception, the RF signal may be received from the first communication network through the first antenna 441 or the fourth antenna 444, and the received RF signal may be transmitted to the communication processor 260 via at least one RFIC. Further, the RF signal may be received from the first communication network or the second communication network through the second antenna 442 or the third antenna 443, and the received RF signal may be transmitted to the communication processor 260 via at least one RFIC.

According to various embodiments, when the electronic device transmits a signal through one of the first antenna 441 and the fourth antenna 444 via the first RFFE 431 and the first switch 451 and transmits a reference signal through the first antenna 441, the second antenna 442, the third antenna 443, and the fourth antenna 444, the electronic device may operate with '1T2R' or '1T4R'.

According to various embodiments, when the electronic device simultaneously transmits and receives data through the first RFFE 431 and the second RFFE 432, the electronic device transmits a reference signal by using two transmission antennas (Tx) and four reception antennas (Rx), and thus may be referred to as '2T4R'. The electronic device illustrated in FIG. 4B may operate with 1T4R or 2T4R according to various embodiments, and thus may be referred to as an electronic device supporting '1T4R/2T4R'.

According to various embodiments, the communication processor 260 may perform control to transmit a reference signal (for example, a sounding reference signal (SRS)) referenced for channel estimation by a base station of the first communication network to at least one antenna (the first antenna 441 or the fourth antenna 444) among a plurality of antennas of the first antenna group through the first RFFE circuit 431. According to various embodiments, the communication processor 260 may perform control to transmit the reference signal referenced for channel estimation by the base station of the first communication network at least one antenna (the second antenna 442 or the third antenna 443) among a plurality of antennas of the second antenna group through the second RFFE circuit 432. When the electronic device transmits the reference signal through the first antenna 441, the second antenna 442, the third antenna 443, or the fourth antenna 444, the base station of the first communication network may receive the reference signal and perform channel estimation through the received reference signal. The base station of the first communication network may transmit a signal beamformed for the first antenna 441, the second antenna 442, the third antenna 443, or the fourth antenna 444. The electronic device may receive the signal transmitted from the base station of the first communication network through the first antenna 441, the second antenna 442, the third antenna 443, or the fourth antenna 444. The electronic device illustrated in FIG. 4B may transmit a reference signal to the base station of the first communication network through the first antenna 441, the second antenna 442, the third antenna 443, or the fourth antenna 444 according to various embodiments, so as to operate with '1T4R'.

As illustrated in FIG. 4B, when the electronic device operates with '1T4R', the communication processor 260 may transmit the reference signal referenced for channel estimation by the base station of the first communication network to the first antenna 441, the second antenna 442, the third antenna 443, and the fourth antenna 444 through the RFIC 410. According to a comparative example, as described above, a relatively larger path loss may be generated due to the length of the transmission path from the RFIC 410 to the third antenna 443 or the fourth antenna 444 via the first RFFE 431, the first switch 451, and the second switch 452 and elements (for example, switches) disposed on the corresponding transmission path.

According to various embodiments, when the electronic device (for example, the communication processor 260) transmits the reference signal to the second antenna 442 and/or the third antenna 443 through the RFIC 410, the electronic device may perform control to transmit the reference signal through the second RFFE 432 and the second switch 452 without transmitting the reference signal through the first RFFE 431, the first switch 451, and the second switch 452 from the RFIC 410. According to various embodiments, even though the electronic device is designed as a device supporting 1T4R, at least one transmission path having a relatively large path loss among the transmission paths of the reference signal may be changed to at least one transmission path having a relatively small path loss for transmission. A method of changing the transmissions path for transmitting the reference signal is not limited to the method illustrated in FIG. 4B, and, when the electronic device includes a plurality of RFICs, the electronic device may change the entire transmission path of the reference signal by changing the RFIC on the transmission path.

According to various embodiments, it is illustrated that one RFIC 410 is connected to two RFFEs 431 and 432 and transmits the reference signal in FIG. 4B, various forms of structures in which at least one RFIC is connected to three or more RFFEs and each RFFE is connected to at least one antenna (for example, one antenna or three or more antennas) may also be applied.

Figure 4C:
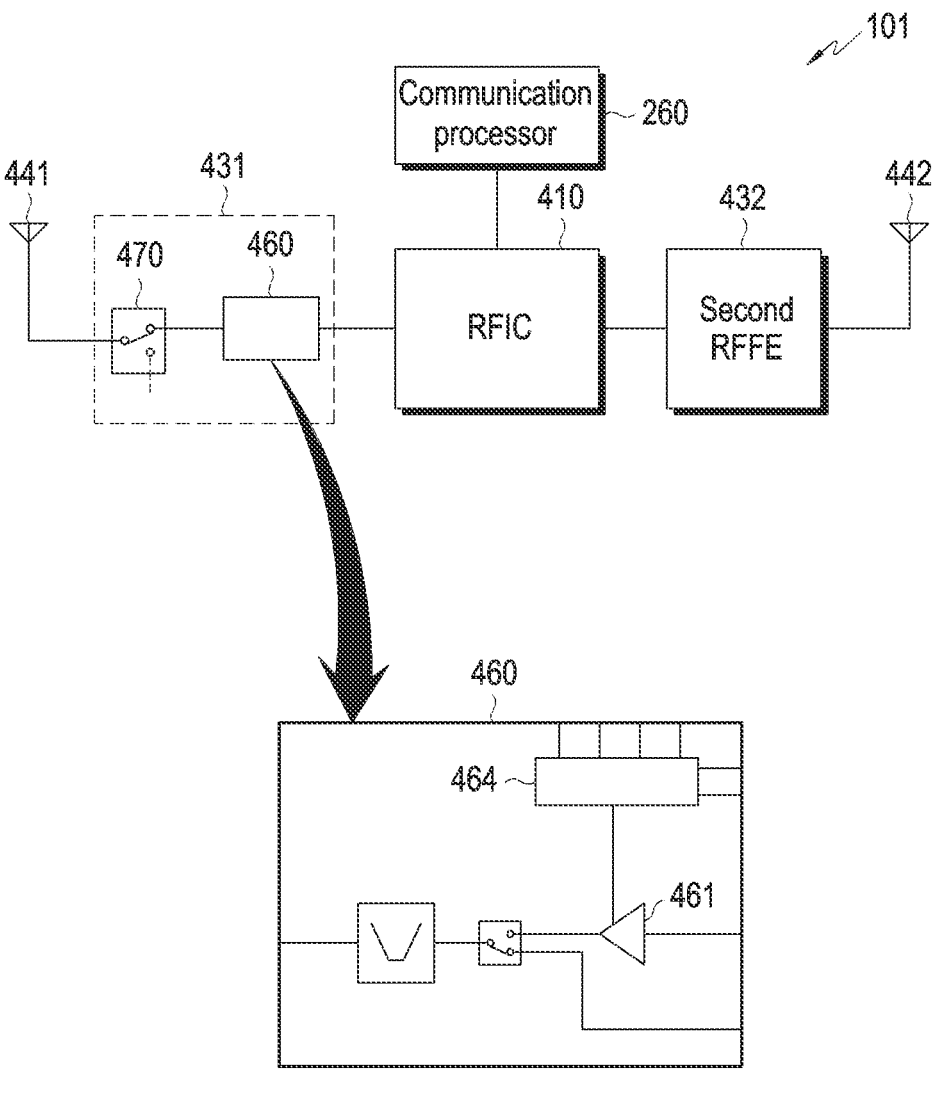
FIG. 4C is a block diagram illustrating the electronic device according to an embodiment of the disclosure.

FIG. 4C is a block diagram illustrating the electronic device in detail according to an embodiment of the disclosure.

Referring to FIG. 4C, the electronic device (for example, the electronic device 101 of FIG. 1) according to various embodiments may include the communication processor 260, the RFIC 410, the first RFFE 431, the first antenna 441, the second RFFE 432, and the second antenna 442.

According to various embodiments, the first RFFE 431 may further include additional elements different from the second RFFE 432 in order to process a signal suitable for the characteristic of the 5G network or support a multi-band. For example, the first RFFE 431 may include a front end module (FEM) 460 and a first single pole double throw (SPDT) switch 470.

According to various embodiments, the FEM 460 may include a power amplifier (PA) 461 and a PA envelop tracking (ET) IC 464. According to various embodiments, the PA ET IC 464 may be included within the FEM 460 as illustrated in FIG. 4C, or may be connected to the FEM 460 outside the FEM 460. The PA ET IC 464 may control Vcc of the PA 461 according to the control of the communication processor 260 or the RFIC 410. The PA ET IC 464 may operate in a plurality of modes (for example, an envelope tracking (ET) mode, an average power tracking (APT) mode, or a maximum power mode (for example, APT full bias or battery direct)) according to the control of the communication processor 260 or the RFIC 410, and a detailed embodiment thereof will be described below with reference to FIGS. 12A, 12B, and 12C.

Figure 5A:
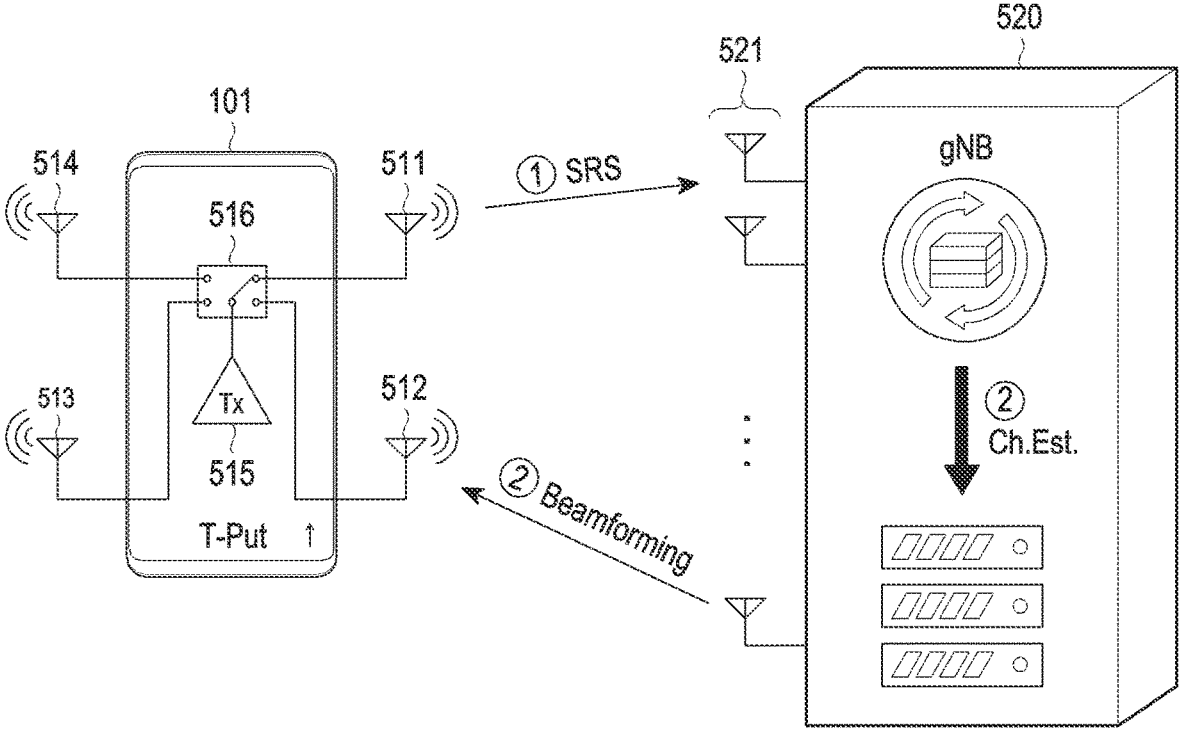
FIGS. 5A and 5B illustrate transmission of a reference signal by the electronic device according to various embodiments of the disclosure.
Figure 5B:
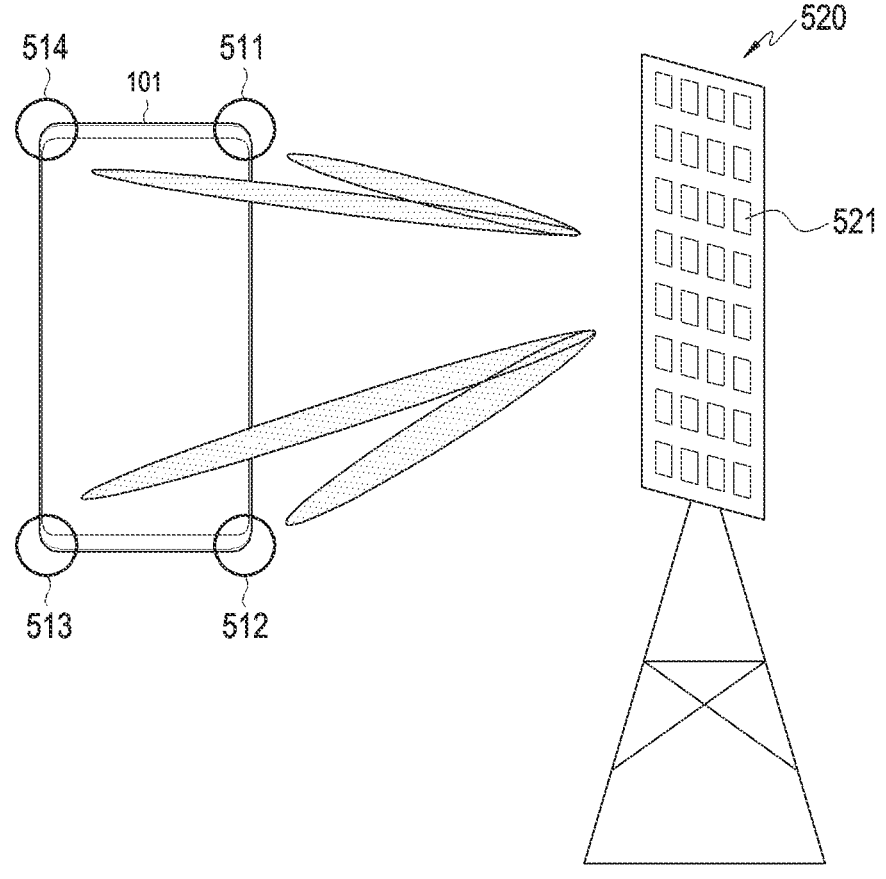

FIGS. 5A and 5B illustrate transmission of a reference signal by the electronic device according to various embodiments of the disclosure.

Referring to FIG. 5A, the electronic device 101 (for example, the electronic device 101 of FIG. 1) may transmit a reference signal (for example, an SRS) through four antennas (for example, a first antenna 511, a second antenna 512, a third antenna 513, and a fourth antenna 514). For example, the electronic device 101 may amplify the reference signal through at least one power amplifier (PA) 515 and transmit the amplified reference signal to the first antenna 511, the second antenna 512, the third antenna 513, and the fourth antenna 514) through at least one switch 516. The reference signal (for example, the SRS) transmitted through each antenna (for example, the first antenna 511, the second antenna 512, the third antenna 513, or the fourth antenna 514) of the electronic device 101 may be received through each antenna 521 of a base station 520 (for example, gNB).

According to various embodiments, the base station 520 may receive the reference signals transmitted from the electronic device 101 and perform channel estimation for each antenna (for example, the first antenna 511, the second antenna 512, the third antenna 513, or the fourth antenna 514) of the electronic device 510 on the basis of the received reference signals. The base station 520 may transmit a beamformed signal to each antenna of the electronic device 101 on the basis of the channel estimation.

FIG. 5A illustrates one power amplifier 515 and one switch 516, connected to a plurality of antennas (the first antenna 511, the second antenna 512, the third antenna 513, and the fourth antenna 514) for convenience of the description, but those skilled in the art can easily understand that it is not limited thereto. For example, the electronic device 101 may include elements included in the electronic device 101 illustrated in FIG. 4A or 4B.

Referring to FIG. 5B, the gNB 520 may transmit beamformed signals through array antennas 521 including a plurality of (for example, 32) antennas. The signals transmitted by the gNB 520 may be received through the respective antennas (for example, the first antenna 511, the second antenna 512, the third antenna 513, and the fourth antenna 514) of the electronic device 101, and the signals may be received in the form of beams directed to the respective antennas (for example, the first antenna 511, the second antenna 512, the third antenna 513, and the fourth antenna 514) of the electronic device 101 by beamforming of the gNB 520 as illustrated in FIG. 5B.

Referring to FIGS. 5A and 5B, when the electronic device 101 transmits a reference signal (for example, an SRS) through a plurality of transmission paths), the gNB 520 may identify a channel environment with the respective antennas (for example, the first antenna 511, the second antenna 512, the third antenna 513, and the fourth antenna 514) of the electronic device 101 to perform beamforming, thereby improving reference signal received power (RSRP) and/or a signal to noise ratio (SNR) of a downlink channel. When the RSRP and/or the SNR of the downlink channel are improved, a rank index (RI) or a channel quality indicator (CQI) for the corresponding electronic device may become higher. The gNB 520 may allocate a high rank or modulation and code schemes (MCS) to the corresponding electronic device 101 on the basis of the improved performance of the corresponding electronic device 101, thereby improving downlink throughput of the electronic device 101.

According to various embodiments, the gNB 520 may use a downlink reference signal for downlink channel estimation. For example, when the gNB 520 transmits the downlink reference signal to the electronic device 101, the electronic device 101 may receive the downlink reference signal transmitted by the gNB 520 and perform channel estimation. The electronic device 101 may transmit the result of channel estimation to the gNB 520, and the gNB 520 may perform downlink beamforming with reference to the result of channel estimation transmitted by the electronic device 101. According to various embodiments, when the gNB 520 performs channel estimation by the reference signal (for example, the SRS) transmitted by the electronic device 101, the channel estimation may be more rapidly performed than the channel estimation by the downlink reference signal.

According to various embodiments, the first communication network (for example, gNB) or the second communication network (for example, eNB) may transmit a UE capability enquiry message to the electronic device 101 to make a request for various pieces of configuration information. For example, the first communication network (for example, gNB) or the second communication network (for example, eNB) may make a request for information related to a reception antenna of the electronic device 101 through the UE capability enquiry message. The electronic device 101 may receive the UE capability enquiry message from the first communication network or the second communication network and transmit a UE capability information message to the first communication network or the second communication network in response thereto. According to various embodiments, the UE capability information message may include the information related to the reception antenna of the electronic device 101 corresponding to 'supportedSRS-TxPortSwitch t1r4' in accordance with the content of the UE capability enquiry message.

The information related to the antenna corresponding to 'supportedSRS-TxPortSwitch t1r4' is included, the first communication network may determine that the electronic device 101 can transmit signals through four reception antennas, insert information on time points at which reference signals (for example, SRSs) are transmitted for respective antennas of the four antennas into an RRC reconfiguration message, and transmit the RRC reconfiguration message.

Figure 6:
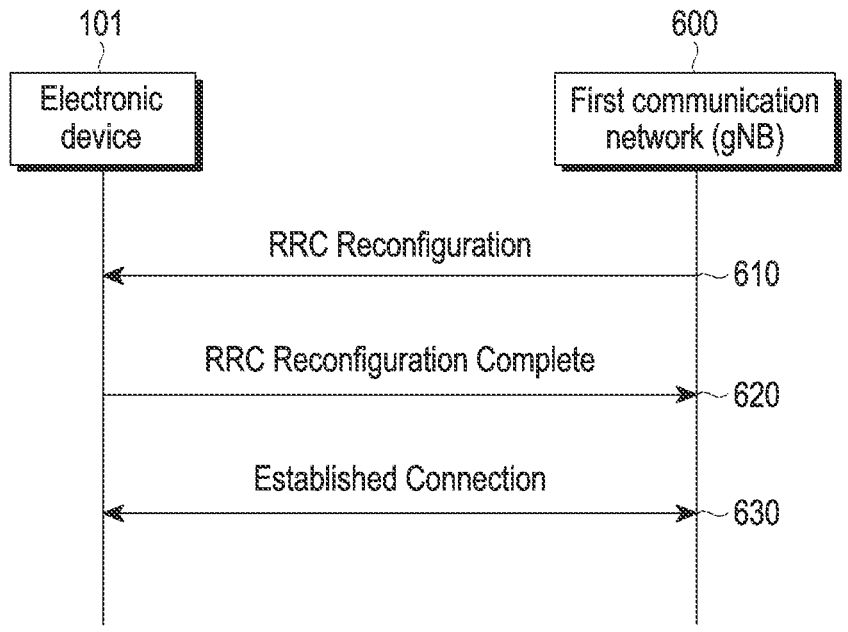
FIG. 6 is a flowchart illustrating a signal transmission/reception procedure between the electronic device and the communication network according to an embodiment of the disclosure.

FIG. 6 is a flowchart illustrating a signal transmission/reception procedure between the electronic device and the communication network according to an embodiment of the disclosure.

Referring to FIG. 6, the electronic device 101 may configure an RRC connection with a first communication network 600 (for example, the gNB) through a random access channel (RACH) procedure.

According to various embodiments, in operation 610, the first communication network 600 may transmit an RRC reconfiguration message to the electronic device 101. For example, the first communication network 600 may transmit the RRC reconfiguration message in response to an RRC request message transmitted by the electronic device 101. As described above, the RRC reconfiguration message may include the following information on time points at which the electronic device 101 transmits reference signals (for example, SRSs) for respective antennas.

perodicityAndOffset-p s120:17
    perodicityAndOffset-p s120:7
    perodicityAndOffset-p s120:13
    perodicityAndOffset-p s120:3
    nrofSymbols n1

Referring to the RRC reconfiguration message, it may be noted that duration during which the SRS is transmitted is determined as allocated symbols as indicated by "nrofSymbols n1.". Referring to the RRC reconfiguration message, it may be configured that a first SRS is transmitted in a $17^{th}$ slot once in 20 slots as indicated by "periodicityAndOffset-p s120:17", a second SRS is transmitted in a $7^{th}$ slot once in 20 slots as indicated by "periodicityAndOffset-p s120:7", a third SRS is transmitted in a $13^{th}$ slot once in 20 slots as indicated by "periodicityAndOffset-p s120:13", and a fourth SRS is transmitted in a $3^{rd}$ slot once in 20 slots as indicated by "periodicityAndOffset-p s120:3".

According to various embodiments, the electronic device 101 may transmit the four SRSs through the respective antennas at different times in every 20 slots according to the configuration of the RRC reconfiguration. The size of one slot may be determined by subcarrier spacing (SCS). For example, when SCS is 30 KHz, a time interval of one slot may be 0.5 ms and a time interval of 20 slots may be 10 ms. Accordingly, the electronic device 101 may repeatedly transmit the SRSs at different times through the respective antennas according to a period of every 10 ms. According to various embodiments, one slot may include 14 symbols, and may have a symbol duration time (or a symbol enable time) of 0.5 ms*1/14=35 μs (0.035 ms) when it is assumed that one symbol is allocated for one SRS transmission.

According to various embodiments, in operation 620, the electronic device 101 may transmit an RRC reconfiguration complete message to the first communication network 600. As the RRC reconfiguration procedure is normally completed, the electronic device 101 and the first communication network 600 may complete the RRC connection configuration in operation 630.

Referring back to FIGS. 4A and 4B, according to various embodiments, the communication processor 260 and/or the RFIC 410 may transmit reference signals at different times according to every configured time period (for example, 10 ms) through the respective antenna transmission paths (for example, the first antenna transmission path, the second antenna transmission path, the third antenna transmission path, and the fourth antenna transmission path) on the basis of information on transmission time points of the reference signals (for example, SRSs) received from the first communication network 600 as described above.

Figure 7:
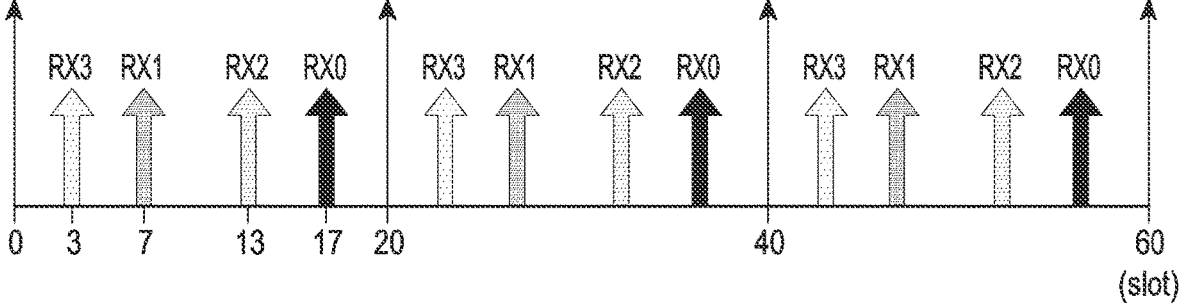
FIG. 7 illustrates transmission periods of the reference signals according to an embodiment of the disclosure.

FIG. 7 illustrates transmission periods of the reference signals according to an embodiment of the disclosure.

Referring to FIG. 7, for example, a first SRS may be transmitted through the first antenna 441 (RX0P in a $17^{th}$ slot among 20 slots in every 10 ms, a second SRS may be transmitted through the second antenna 442 (RX1) in a $7^{th}$ slot, a third SRS may be transmitted through the third antenna 443 (RX2) in a $13^{th}$ slot, and a fourth SRS may be transmitted through the fourth antenna 444 (RX3) in a $3^{rd}$ slot.

According to various embodiments, the reference signals may be sounding reference signals (SRSs) used for multi-antenna signal processing (for example, multi input multi output (MIMO) or beamforming) through uplink channel state measurement, but are not limited thereto. For example, the SRS is described as an example of the reference signal in the above description or the following description, but any type of uplink reference signal (for example, uplink demodulation reference signal (DM-RS) transmitted from the electronic device 101 to the base station may be included in the reference signal described below.

Figure 8A:
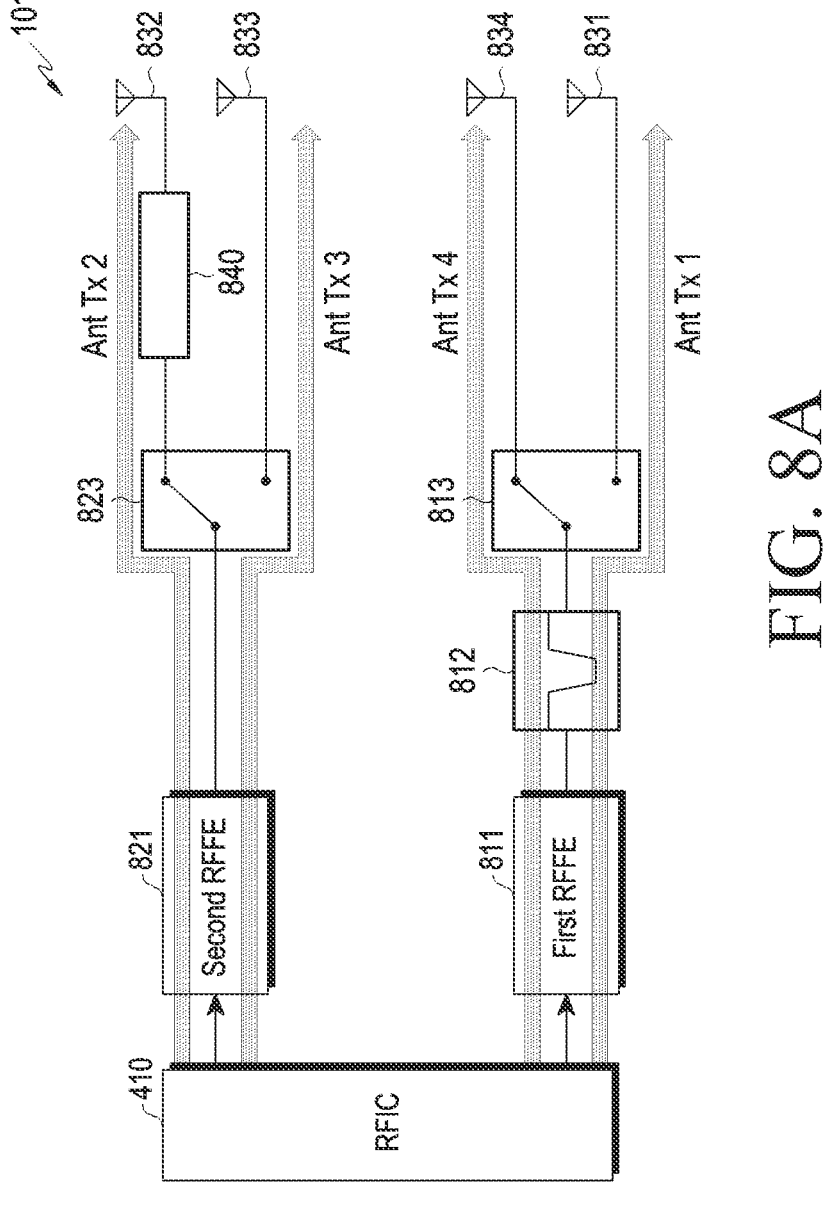
FIG. 8A is a circuit diagram illustrating a detailed circuit of the electronic device according to an embodiment of the disclosure.
Figure 8B:
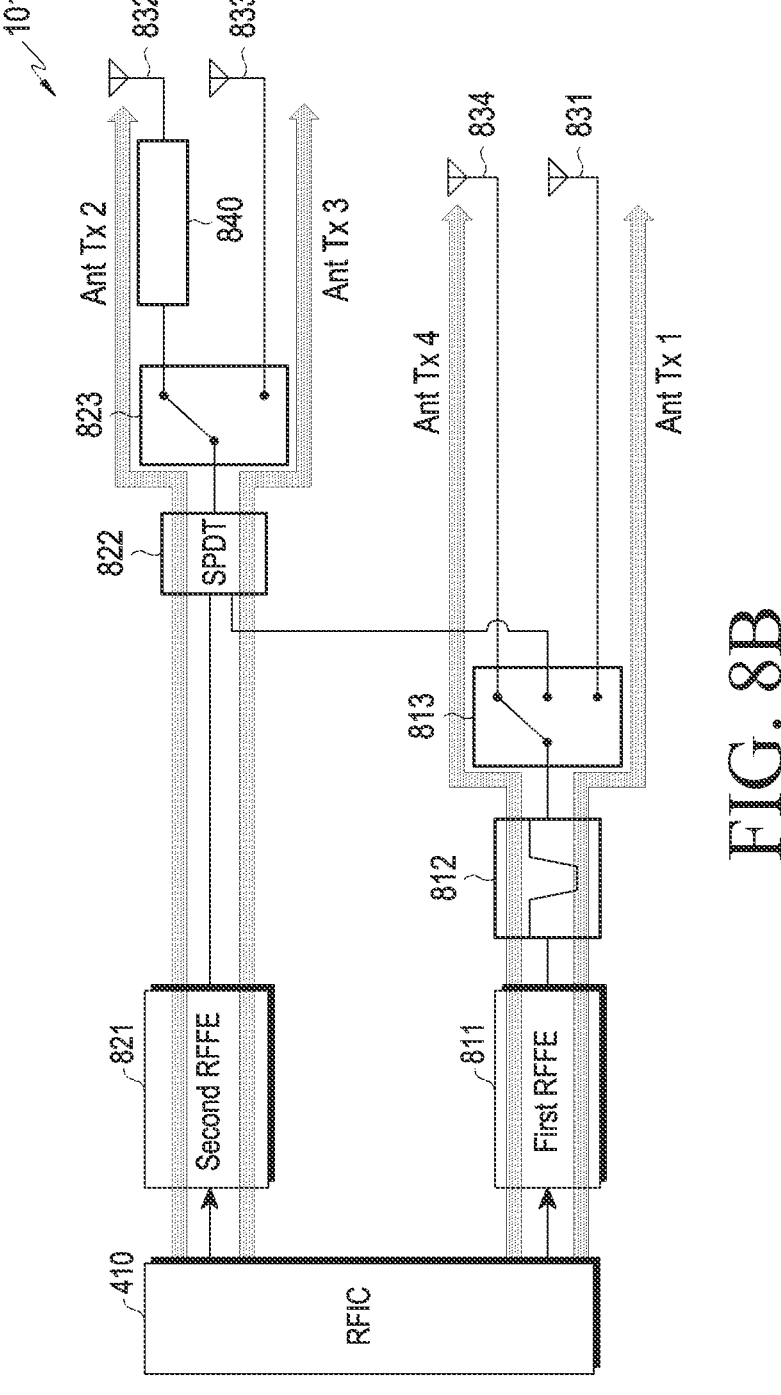
FIG. 8B is a circuit diagram illustrating a detailed circuit of the electronic device according to an embodiment of the disclosure.
Figure 9:
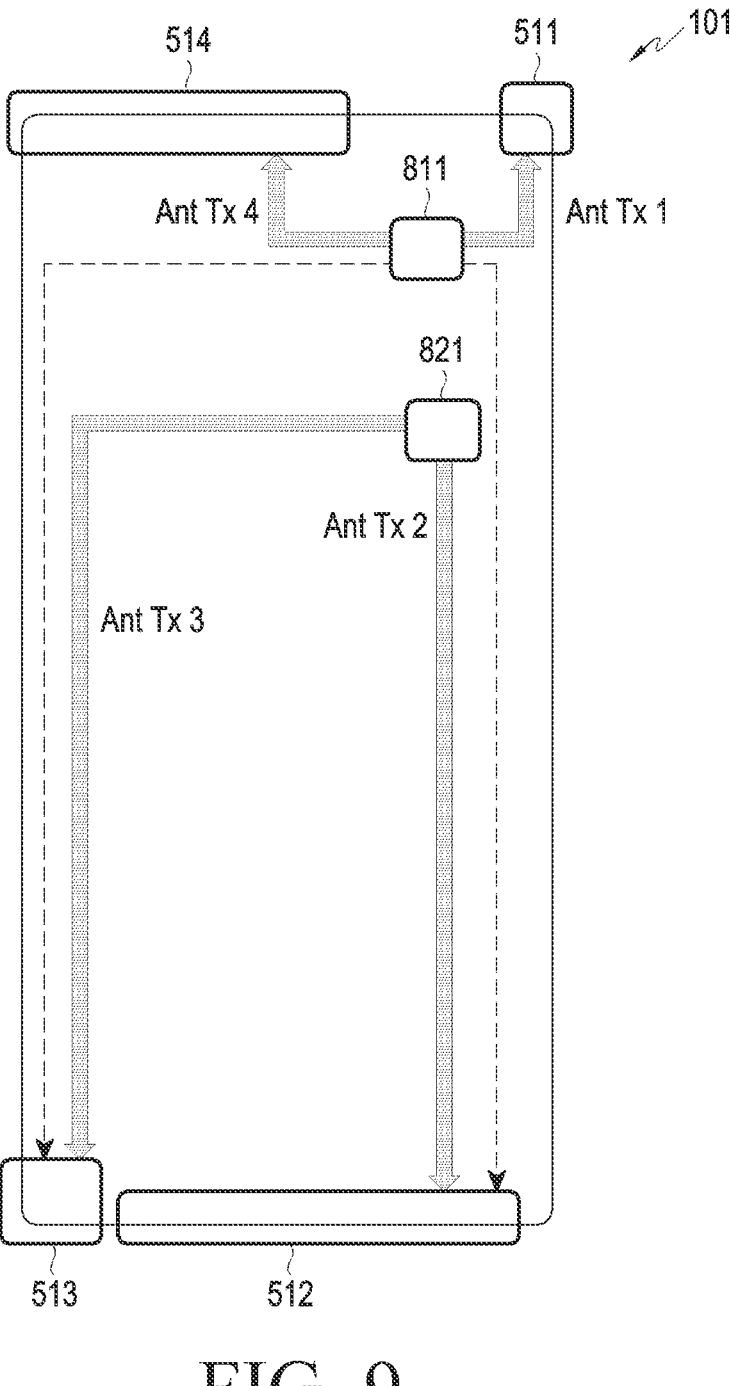
FIG. 9 is a block diagram illustrating the structure of the electronic device according to an embodiment of the disclosure.

FIGS. 8A and 8B are circuit diagrams illustrating detailed circuits of the electronic device according to various embodiments of the disclosure.

Referring to FIG. 8A, the electronic device 101 may include the RFIC 410, a first RFFE 811, a first filter 812, a first switch 813 (for example, SP3T or SP4T), a second RFFE 821, a third switch 823, a first antenna 831, a second antenna 832, a third antenna 833, a fourth antenna 834, and a diplexer 840. As illustrated in FIG. 4A, the electronic device 101 as illustrated in FIG. 8A may operate with '1T2R' or '2T4R'.

According to various embodiments, in transmission, the RFIC 410 may convert a baseband signal generated by the communication processor 260 into a radio frequency (RF) signal used for the first communication network or the second communication network. For example, the RFIC 410 may transmit the RF signal used for the first communication network to the first antenna 831 or the fourth antenna 834 through the first RFFE 811 and the first switch 813. Further, the RFIC 410 may transmit the RF signal used for the second communication network to the second antenna 832 or the third antenna 833 through the second RFFE 821 and the third switch 823.

According to various embodiments, at least one element (for example, the first filter 812) may be added between the first RFFE 811 and the first switch 813, and for example, the first filter 812 may be a notch filter for preventing an NR band transmission signal from influencing a WIFI band signal (for example, 2.4 GHz). The diplexer 840 may be added between the third switch 823 and the second antenna 832, and the diplexer 840 may process a mid/high band/ultra high band signal. According to various embodiments, in FIG. 8A, the first filter 812 and/or the diplexer 840 may be omitted or replaced with other elements.

According to various embodiments, when the electronic device 101 operates with '1T2R', the electronic device may insert information related to the antennas of the electronic device 101 corresponding to 'supportedSRS-TxPortSwitch t1r2' into the following UE capability information message and transmit the UE capability information message to the base station.

```
SupportedBandCombinationList
{
bandList
{
Srs-TxSwitch
{
supportedSRS-TxPortSwitch notSupported
}
Srs-TxSwitch
{
supportedSRS-TxPortSwitch t1r2
}
}
}
```

The base station may identify the information related to the antennas of the electronic device 101 included in the UE capability information message and transmit information related to time points at which reference signals (for example, SRSs) for two reception antennas are transmitted through the RRC reconfiguration message.

Even through the electronic device 101 is designed to operate with '1T2R', the electronic device may operate with '1T4R' by transmitting the reference signal to the first network through the second RFFE 821 according to various embodiments. When the electronic device 101 operates with '1T4R', the electronic device may insert the following information related to the antennas of the electronic device 101 corresponding to 'supportedSRS-TxPortSwitch t1r4' into the UE capability information message and transmit the UE capability information to the base station.

```
SupportedBandCombinationList
{
bandList
{
Srs-TxSwitch
{
supportedSRS-TxPortSwitch notSupported
}
Srs-TxSwitch
{
supportedSRS-TxPortSwitch t1r4
}
}
}
```

The base station may identify the information related to the antennas of the electronic device 101 included in the UE capability information message and transmit information related to time points at which reference signals (for example, SRSs) for four reception antennas are transmitted through the RRC reconfiguration message.

According to various embodiments, the electronic device may identify time points at which reference signals are transmitted for respective reception antennas (for example, the first antenna 831, the second antenna 832, the third antenna 833, and the fourth antenna 834) from the base station and transmit the reference signals through the respective antennas at the corresponding time points. For example, as illustrated in FIG. 7, a first SRS may be transmitted through the first RFFE 811 and the first antenna 831 in a $17^{th}$ slot among 20 slots in every 10 ms, a second SRS may be transmitted through the second RFFE 821 and the second antenna 832 in a $7^{th}$ slot, a third SRS may be transmitted through the second RFFE 821 and the third antenna 833 in a $13^{th}$ slot, and a fourth SRS may be transmitted through the first RFFE 811 and the fourth antenna 834 in a $3^{rd}$ slot.

According to various embodiments, the electronic device may transmit the reference signals to the respective antennas (for example, the first antenna 831, the second antenna 832, the third antenna 833, and the fourth antenna 834) through the first RFFE 811 or the second RFFE 821 at the transmission time points of the reference signals. As described above, even though the electronic device is designed to operate with '1T2R', the electronic device may operate with '1T4R' by transmitting the reference signals by using the first RFFE 811 and the second RFFE 821 together to transmit the reference signals to the first network. According to various embodiments, the first RFFE 811 and the second RFFE 821 may be designed to transmit signals in the same frequency band.

Referring to FIG. 8B, the electronic device 101 may include the RFIC 410, the first RFFE 811, the first filter 812, the first switch 813 (for example, SP3T or SP4T), the second RFFE 821, a second switch 822 (for example, SPDT), the third switch 823, the first antenna 831, the second antenna 832, the third antenna 833, the fourth antenna 834, and the diplexer 840. As illustrated in FIG. 4B, the electronic device 101 illustrated in FIG. 8B may operate with '1T4R' or '2T4R'.

According to various embodiments, in transmission, the RFIC 410 may convert a baseband signal generated by the communication processor 260 into a radio frequency (RF) signal used for the first communication network or the second communication network. For example, the RFIC 410 may transmit the RF signal used for the first communication network to the first antenna 831 or the fourth antenna 834 through the first RFFE 811 and the first switch 813. Further, the RFIC 410 may transmit the RF signal used for the first communication network to the second antenna 832 or the third antenna 833 through the first RFFE 811, the first switch 813, the second switch 822, and the third switch 823. According to various embodiments, when the electronic device transmits the RF signal used for the first communication network to the second antenna 832 or the third antenna 833 through the first RFFE 811, the first switch 813, the second switch 822, and the third switch 823, a relatively larger path loss may be generated as illustrated in FIG. 4B. According to various embodiments, when the electronic device transmits the reference signal (for example, SRSs) to the second antenna 832 or the third antenna 833 through the RFIC 410, the reference signal may not be transmitted through the first RFFE 811, the first switch 813, the second switch 822, and the third switch 823 but may be transmitted through the second RFFE 821, the second switch 822, and the third switch 823, which may generate a relatively smaller path loss.

According to various embodiments, at least one element (for example, the first filter 812) may be added between the first RFFE 811 and the first switch 813, and for example, the first filter 812 may be a notch filter for preventing an NR band transmission signal from influencing a WIFI band signal (for example, 2.4 GHz). The diplexer 840 may be added between the third switch 823 and the second antenna 832, and the diplexer 840 may process a mid/high band/ultra high band signal. According to various embodiments, in FIG. 8B, the first filter 812 and/or the diplexer 840 may be omitted or replaced with other elements.

As described above, according to various embodiments, as the electronic device 101 operates with 1T4R, the electronic device may transmit four reference signals through four antenna transmission paths (Ant Tx). For example, a transmission path from the RFIC 410 to the first antenna 831 via the first RFFE 811 and the first switch 813 may be referred to as a 'first antenna transmission path (Ant Tx1)'. A transmission path from the RFIC 410 to the fourth antenna 834 via the first RFFE 811 and the first switch 813 may be referred to as a 'fourth antenna transmission path (Ant Tx4)'. A transmission path from the RFIC 410 to the third antenna 833 via the second RFFE 812, the second switch 822, and the third switch 823 may be referred to as a 'third antenna transmission path (Ant Tx3)'. A transmission path from the RFIC 410 to the second antenna 832 via the second RFFE 812, the second switch 822, the third switch 823, and the diplexer 840 may be referred to as a 'second antenna transmission path (Ant Tx2)'. According to various embodiments, the electronic device 101 may transmit four reference signals (for example, SRSs) through the first antenna transmission path, the second antenna transmission path, and the third antenna transmission path, and the fourth antenna transmission path.

According to a comparative example, the respective antenna transmission paths within the electronic device 101 may generate different path losses due to difference in the length of transmission paths and elements disposed on the corresponding transmission paths.

Referring to FIG. 9, the electronic device 101 supporting 1T4R may have different transmission paths from the first RFFE 811 to the respective antennas (for example, the first antenna 511, the second antenna 512, the third antenna 513, and the fourth antenna 514), which causes different path losses. As illustrated in FIG. 9, the transmission path from the first RFFE 811 to the second antenna 512 and the third antenna 513 located on the lower part of the electronic device may have a smaller path loss than the transmission path from the first RFFE 811 to the first antenna 511 and the fourth antenna 514 located on the upper part of the electronic device. For example, referring to FIG. 9, when a transmission signal is transmitted from the first RFFE 811 to the second antenna 512 or the third antenna 513, a larger path loss may be generated due to the length of the transmission path and elements (for example, switches) disposed on the corresponding transmission path. For example, the transmission path from the second RFFE 512 to the second antenna 513 and the third antenna 813 may be relatively smaller than the transmission path from the first RFFE 811 to the second antenna 512 and the third antenna 513.

According to various embodiments, loss power corresponding to the transmission path from an RF connector port of each RFFE (for example, the first RFFE 811 or the second RFFE 821) to each antenna (for example, the first antenna

831, the second antenna 832, the third antenna 833, or the fourth antenna 834) may be referred to as 'Tx path loss', but the Tx path loss is not limited to the transmission path.

According to various embodiments, when the electronic device 101 operates with '1T4R', the electronic device may insert information related to antennas of the electronic device 101 corresponding to 'supportedSRS-TxPortSwitch t1r4' into the UE capability information message and transmit the UE capability information message to the base station. The base station may identify the information related to the antennas of the electronic device 101 included in the UE capability information message and transmit information related to time points at which reference signals (for example, SRSs) for four reception antennas are transmitted through the RRC reconfiguration message.

According to various embodiments, the electronic device may identify time points at which reference signals are transmitted for respective reception antennas (for example, the first antenna 831, the second antenna 832, the third antenna 833, and the fourth antenna 834) from the base station and transmit the reference signals through the respective antennas at the corresponding time points. For example, as illustrated in FIG. 7, a first SRS may be transmitted through the first antenna 831 in a $17^{th}$ slot among 20 slots in every 10 ms, a second SRS may be transmitted through the second antenna 832 in a $7^{th}$ slot, a third SRS may be transmitted through the third antenna 833 in a $13^{th}$ slot, and a fourth SRS may be transmitted through the fourth antenna 834 in a $3^{rd}$ slot.

According to various embodiments, the electronic device may transmit reference signals to the respective antennas (for example, the first antenna 831, the second antenna 832, the third antenna 833, and the fourth antenna 834) through the first RFFE 811 at transmission time points of the reference signals.

According to a comparative example for comparison with various embodiments, when the reference signal is transmitted from the first RFFE 811 to the second antenna 832 or the third antenna 833 via the first switch 813, the second switch 822, the third switch 823, a reference signal having the desired size of transmission power may not be transmitted due to a relatively large path loss.

For example, the path loss (for example, transmission path loss) for each path may be expressed by a relative offset value as shown in Table 1 below.

TABLE 1

| | Ant Tx 1 (PRx) | Ant Tx 4 (PRx MIMO) | Ant Tx 2 (DRx) | Ant Tx 3 (DRx MIMO) |
|---|---|---|---|---|
| Path loss (offset) (dBm) | 0 | 3 | 7 | 7 |

Referring to Table 1 above, it may be noted that a fourth antenna transmission path (Ant Tx4) has a path loss 3 dBm larger than a first antenna transmission path (Ant Tx1). It may be noted that each of a second antenna transmission path (Ant Tx2) and a third antenna transmission path (Ant Tx3) has a path loss 7 dBm larger than the first antenna transmission path (Ant Tx1). According to a comparative example, when it is assumed that maximum transmission power configured by the electronic device 101 is 23 dBm, actually available maximum transmission power for the transmission path of each reference signal may be calculated in consideration of the path loss as shown in Table 2 below.

TABLE 2

|  | Ant Tx 1 (PRx) | Ant Tx 4 (PRx MIMO) | Ant Tx 2 (DRx) | Ant Tx 3 (DRx MIMO) |
|---|---|---|---|---|
| Required maximum power (dBm) | 23 | 20 | 20 | 20 |
| Actually available power (dBm) | 23 | 20 | 16 | 16 |
| Shortage of power (dBm) | 0 | 0 | 4 | 4 |

According to the 3GPP standard document, a reception port delta value (Rx port delta) ($\Delta T_{RxSRS}$) is applied to SRS ports other than the first SRS port. For example, the Rx port delta may be applied when '1T2R', '1T4R', or '1T4R/2T4R' is in the SRS-TxSwitch capability of the electronic device having four SRS resources in the SRS resource set or '1T2R' or '1T4R/2T4R' in the SRS-TxSwitch capability of the electronic device having two SRS resources in the SRS resource set. As the Rx port delta, 4.5 dB may be applied to a frequency band of n79, and 3 dB may be applied to a frequency band having $F_{UL\_high}$ lower than $F_{UL\_low}$ of n79. Referring to Table 2 above, when maximum transmission power of an antenna (for example, the first antenna 831) used as the transmission antenna and the reception antenna among the plurality of antennas is 23 dBm, maximum transmission power of antennas (for example, the second antenna 832, the third antenna 833, and the fourth antenna 834) used as only the reception antenna may be configured as 20 dBm through the application of the Rx port delta. In Table 2 above, when the pass loss of Table 1 is applied, it may be noted that the actually available power is 16 dBm, which is lower in the second antenna transmission path (Ant Tx2) and the third antenna transmission path (Ant Tx3). Referring to Table 2 above, as the actually available power, maximum power required for the first antenna transmission path (Ant Tx1) and the fourth antenna transmission path (Ant Tx4) can be transmitted, but 4 dB smaller power can be transmitted in the second antenna transmission path (Ant Tx2) and the third antenna transmission path (Ant Tx3). For example, the second antenna 832 operating as DRx and the third antenna 833 operating as DRx MIMO may need maximum transmission power of 20 dBm, but actually transmittable maximum power may be lowered to 16 dBm due to the path loss. According to a comparative example, when the maximum transmission power of the specific transmission path is lowered due to the high path loss as described above, a maximum transmission rate may decrease and the performance may deteriorate compared to the electronic device capable of normally transmitting the reference signal because of a relatively small path loss.

According to various embodiments, when the reference signals are transmitted through the second antenna 832 and the third antenna 833, the path loss may decrease as shown in Table 3 below if the reference signals are transmitted through the second RFFE 821 rather than through the first RFFE 811.

TABLE 3

|  | Ant Tx 1 (PRx) | Ant Tx 4 (PRx MIMO) | Ant Tx 2 (DRx) | Ant Tx 3 (DRx MIMO) |
|---|---|---|---|---|
| Path loss (offset) (dBm) | 0 | 3 | 0 | 3 |

When the reference signals are transmitted using the second RFFE 821 as described above, if it is assumed that maximum transmission power configured in the electronic device 101 is 23 dBm, actually available maximum transmission power for the transmission path of each reference signal may be calculated in consideration of the path loss as shown in Table 4 below.

TABLE 4

|  | Ant Tx 1 (PRx) | Ant Tx 4 (PRx MIMO) | Ant Tx 2 (DRx) | Ant Tx 3 (DRx MIMO) |
|---|---|---|---|---|
| Required maximum power (dBm) | 23 | 20 | 20 | 20 |
| Actually available power (dBm) | 23 | 20 | 20 | 20 |
| Shortage of power (dBm) | 0 | 0 | 0 | 0 |

Referring to Table 4 above, when the reference signals are transmitted to the second antenna 832 and the third antenna 833, the path loss may decrease by transmission through the second RFFE 821 rather than the first RFFE 811, thereby transmitting the reference signals with required maximum power. According to various embodiments, the electronic device may identify time points at which reference signals are transmitted for respective reception antennas (for example, the first antenna 831, the second antenna 832, the third antenna 833, and the fourth antenna 834) from the base station and transmit the reference signals through the respective antennas at the corresponding time points. For example, as illustrated in FIG. 7, a first SRS may be transmitted through the first RFFE 811 and the first antenna 831 in a $17^{th}$ slot among 20 slots in every 10 ms, a second SRS may be transmitted through the second RFFE 821 and the second antenna 832 in a $7^{th}$ slot, a third SRS may be transmitted through the second RFFE 821 and the third antenna 833 in a $13^{th}$ slot, and a fourth SRS may be transmitted through the first RFFE 811 and the fourth antenna 834 in a $3^{rd}$ slot.

Figure 10:
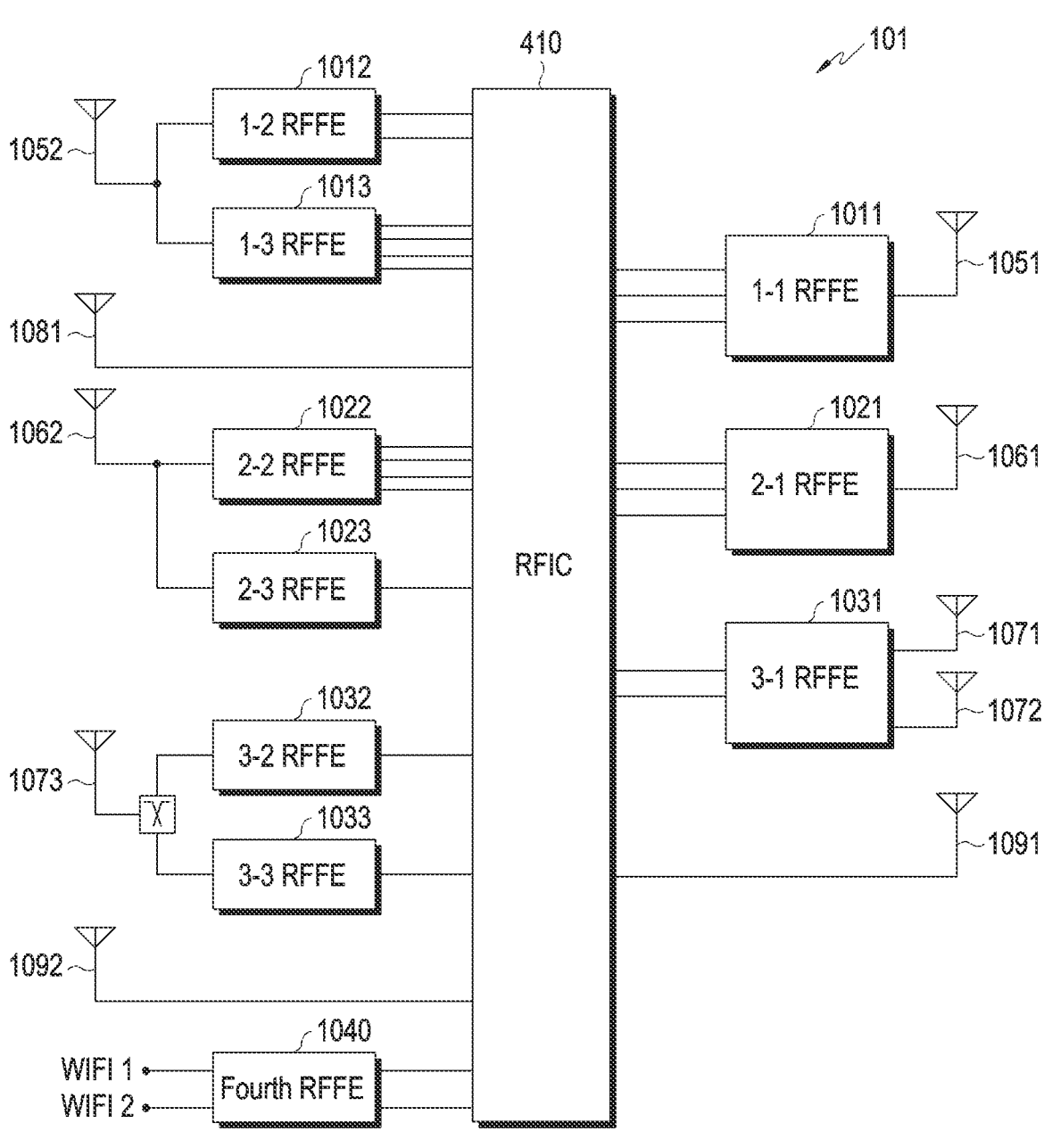
FIG. 10 is a block diagram of an electronic device according to an embodiment of the disclosure.

FIG. 10 is a block diagram of an electronic device according to an embodiment of the disclosure.

Referring to FIG. 10, a plurality of RFFEs 1011, 1012, 1013, 1021, 1022, 1023, 1031, 1032, 1033, and 1040 may be connected to at least one RFIC 410. The plurality of RFFEs 1011, 1012, 1013, 1021, 1022, 1023, 1031, 1032, 1033, and 1040 may be connected to a plurality of antennas 1051, 1052, 1061, 1062, 1071, 1072, 1073, 1081, 1091, and 1092.

According to various embodiments, the 1-1 RFFE 1011 and the 2-1 RFFE 1021 may be connected to the first main antenna 1051 and the second main antenna 1061, respectively. The 1-2 RFFE 1012 and the 1-3 RFFE 1013 may be connected to the first sub antenna 1052 to provide diversity with the first main antenna 1051. The 2-2 RFFE 1022 and the 2-3 RFFE 1023 may be connected to the first sub antenna 1062 to provide diversity with the second main antenna 1061. The 3-1 RFFE 1031 may be connected to two third main antennas 1071 and 1072 to provide MIMO. Further, the 3-2 RFFE 1032 and the 3-3 RFFE 1033 may be connected to the third sub antenna 1073 to provide MIMO or diversity with the third main antennas 1071 and 1072. The fifth antenna 1081 may be directly connected to the RFIC 410 without passing through the RFFE. The 6-1 antenna 1091 and the 6-2 antenna 1092 may also be directly connected to the RFIC 410 without passing through the RFFE and may provide MIMO or diversity through two antennas.

The fourth RFFE 1040 may be connected to two WIFI antennas (for example, WIFI 1 and WIFI 2).

According to various embodiments, at least one of the RFFEs in FIG. 10 may correspond to one of the first RFFE 431 and the second RFFE 432 described with reference to FIGS. 4A, 4B, and 4C. At least one of the antennas in FIG. 10 may correspond to one of the first antenna 441, the second antenna 442, the third antenna 443, and the fourth antenna 444 described with reference to FIGS. 4A, 4B, and 4C.

Figure 11A:
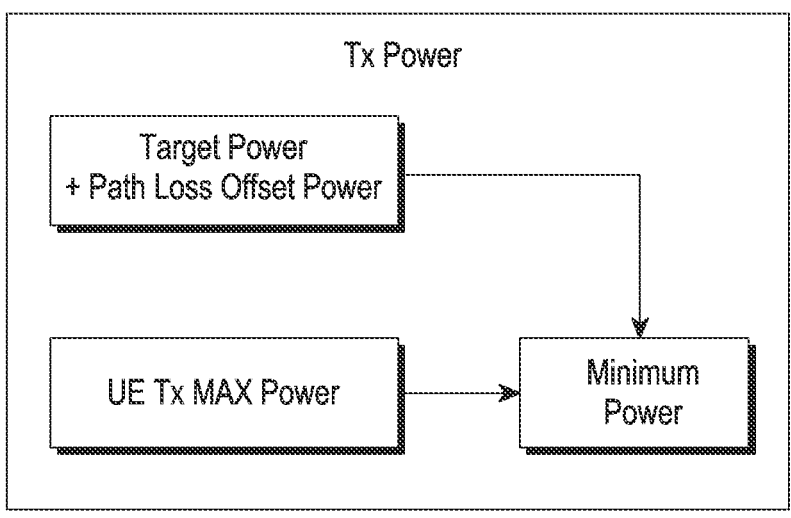
FIGS. 11A and 11B illustrate a method of determining transmission power of a reference signal according to various embodiments of the disclosure.
Figure 11B:
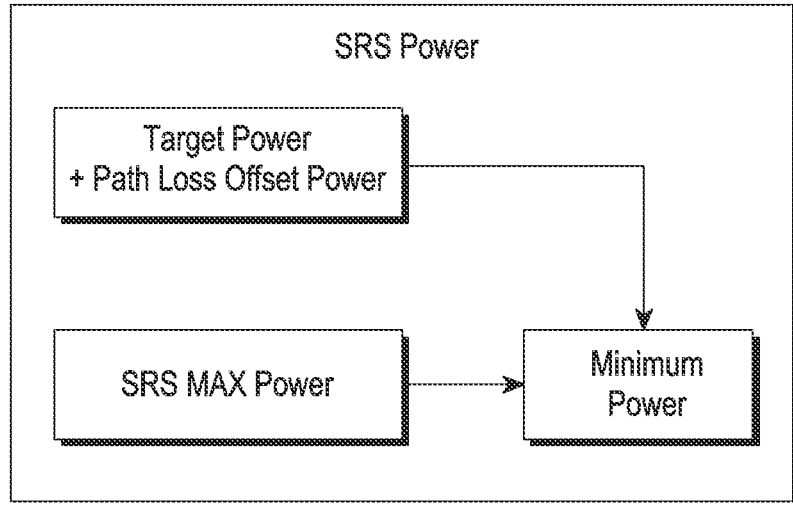

FIGS. 11A and 11B illustrate a method of determining transmission power of a reference signal according to various embodiments of the disclosure.

Referring to FIGS. 11A and 11B, transmission power of the reference signal (for example, SRS) may be determined as a minimum value among transmission target power (Tx target power) considering path loss offset power and maximum transmission power (UE Tx MAX Power) of the electronic device.

For example, when transmission target power is applied to each transmission path, in consideration of the path loss configured for each transmission path, the output with power higher by the corresponding path loss may be generated from the RFFE. In FIG. 11A, the reason why the transmission power is determined as the minimum value among the transmission target power and the maximum transmission power (UE Tx MAX Power) of the electronic device is to prevent the maximum value of the transmission target power from exceeding the maximum transmission power (UE Tx MAX Power) of the electronic device. According to various embodiments, a reception port delta value (Rx port delta) ($\Delta T_{RxSRS}$) may be further applied to the reception antenna path in consideration of the path loss offset power for the transmission target power.

According to various embodiments, a minimum value among available maximum transmission power (PcMax) of the electronic device considering the characteristic of the electronic device, maximum transmission power (PeMax) according to a power class configured in the electronic device, and maximum transmission power (SAR Max Power) considering a specific absorption rate (SAR) backoff event may be determined as the maximum transmission power of the electronic device (UE Tx MAX Power).

According to various embodiments, transmission of the reference signal (for example, SRS) is performed for a shorter time than the entire transmission time, and thus current consumption of the electronic device may not be considered. For example, in transmission of the reference signal, the electronic device may configure transmission power to be higher even though current consumption becomes higher. For example, when maximum transmission power (UE Tx MAX Power) of the electronic device is configured as 23 dBm in consideration of the SAR, maximum transmission power (SRS Max Power) for the reference signal may be configured to be higher than 23 dBm that is the maximum transmission power (UE Tx MAX Power) of the electronic device in FIG. 11A as illustrated in FIG. 11B. For example, the maximum transmission power for the reference signal may be configured as 25.5 dBm in consideration of the performance of the PA envelop tracking (ET) IC 464 of FIG. 4C installed inside or outside the RFFE of the electronic device and configured to control the power amplifier 461. When the maximum transmission power for the reference signal is applied, actually available power for each transmission path may increase as shown in Table 5 below.

TABLE 5

| | Ant Tx 1 (PRx) | Ant Tx 4 (PRx MIMO) | Ant Tx 2 (DRx) | Ant Tx 3 (DRx MIMO) |
|---|---|---|---|---|
| Path loss (offset) (dBm) | 0 | 3 | 7 | 7 |
| Required maximum power (dBm) | 23 | 20 | 20 | 20 |
| Actually available power (dBm) | 23 | 20 | 16 | 16 |
| Maximum reference signal power (dBm) | 23 | 20 | 18.5 | 18.5 |

Referring to Table 5 above, when the maximum transmission power for the reference signal is applied as 25.5 dBm, it may be noted that transmission power for the second antenna 832 and the third antenna 833 may increase by 2.5 dBm from 16 dBm to 18.5 dBm. According to various embodiments, when the electronic device transmits normal data other than the reference signal, the maximum transmission power (UE Tx MAX Power) of the electronic device (for example, 23 dBm) may be applied as illustrated in FIG. 11A, and when the electronic device transmits the reference signal, the maximum transmission power (SRS Max Power) of the reference signal (for example, 25.5 dBm) may be applied as illustrated in FIG. 11B.

According to various embodiments, it may be noted that shortage of maximum power may decrease as shown in Table 6 below by transmitting the reference signal with 2.5 dBm higher power as described above.

TABLE 6

| Shortage of power (dBm) | Ant Tx 1 (PRx) | Ant Tx 4 (PRx MIMO) | Ant Tx 2 (DRx) | Ant Tx 3 (DRx MIMO) |
|---|---|---|---|---|
| Application of Tx MAX Power | 0 | 0 | 4 | 4 |
| Application of SRS Max Power | 0 | 0 | 1.5 | 1.5 |

FIGS. 12A, 12B, and 12C illustrate a method of controlling transmission power of a reference signal according to various embodiments of the disclosure.

Referring to FIGS. 12A, 12B, and 12C, the PA envelop tracking (ET) IC 464 of FIG. 4C installed inside or outside the RFFE of the electronic device and configured to control the power amplifier 461 may operate in various modes according to the size of transmission power. For example, the PA ET IC may operate in a battery direct scheme as illustrated in FIG. 12A, operate in an average power tracking (APT) mode as illustrated in FIG. 12B, or operate in an envelope tracking (ET) mode as illustrated in FIG. 12C. The battery direct mode illustrated in FIG. 12A is a scheme of inputting input power 1201 of the power amplifier 461 as a directly configured value ($V_{batt}$), which may have relatively higher current consumption. The APT mode illustrated in FIG. 12B is a scheme of supplying input power 1202 required for the electronic device, which has current consumption lower than the battery direct mode. In the ET mode illustrated in FIG. 12C, the size of transmission power is tracked and the supply of input power 1203 is controlled, and the ET mode has current consumption higher than the APT mode in predetermined transmission power (for example, 18 dBm) or lower and has lower current consumption than the APT mode in the predetermined transmission power or higher.

According to various embodiments, in consideration of a power consumption characteristic between the ET mode and the ATP mode, the average power tracking (APT) mode may operate as illustrated in FIG. 12B when the transmission power of the reference signal is smaller than an ET threshold value ($ET_{th}$) (for example, 18 dBm) and the envelope tracking (ET) mode may operate as illustrated in FIG. 12C when the transmission power of the reference signal is larger than (or larger than or equal to) the ET threshold value ($ET_{th}$) (for example, 18 dBm).

The ET mode has an advantage of small current consumption in a high output interval, but has a disadvantage of low transmission power compared to the APT mode in most frequency bands (n2, n5, n66, n71, and n41) as shown in Table 7 to Table 11 below.

TABLE 7

| Full bias control | | ET control | |
|---|---|---|---|
| Sample | Power | Sample | Power |
| n2_TX_376000CH RGI_60 | 28.6 | n2_TX_376000CH ET 20 MHz Idx0 | 16.8 |
| n2_TX_376000CH RGI_59 | 27.5 | n2_TX_376000CH ET 20 MHz Idx1 | 18.8 |
| n2_TX_376000CH RGI_58 | 25.5 | n2_TX_376000CH ET 20 MHz Idx2 | 21.8 |
| n2_TX_376000CH RGI_57 | 24.7 | n2_TX_376000CH ET 20 MHz Idx3 | 26 |

TABLE 8

| Full bias control | | ET control | |
|---|---|---|---|
| Sample | Power | Sample | Power |
| n5_TX_167300CH RGI_48 | 28.1 | n5_TX_167300CH ET 20 MHz Idx0 | 17.1 |
| n5_TX_167300CH RGI_47 | 26.1 | n5_TX_167300CH ET 20 MHz Idx1 | 18.9 |
| n5_TX_167300CH RGI_46 | 25.1 | n5_TX_167300CH ET 20 MHz Idx2 | 21.7 |
| n5_TX_167300CH RGI_45 | 24 | n5_TX_167300CH ET 20 MHz Idx3 | 26.3 |

TABLE 9

| Full bias control | | ET control | |
|---|---|---|---|
| Sample | Power | Sample | Power |
| n66_TX_349000CH RGI_60 | 27.5 | n2_TX_376000CH ET 20 MHz Idx0 | 17 |
| n66_TX_349000CH RGI_59 | 26.6 | n2_TX_376000CH ET 20 MHz Idx1 | 19 |
| n66_TX_349000CH RGI_58 | 25.7 | n2_TX_376000CH ET 20 MHz Idx2 | 21.9 |
| n66_TX_349000CH RGI_57 | 24.7 | n2_TX_376000CH ET 20 MHz Idx3 | 25.2 |

TABLE 10

| Full bias control | | ET control | |
|---|---|---|---|
| Sample | Power | Sample | Power |
| n71_TX_136100CH RGI_57 | 28.9 | n71_TX_136100CH ET 20 MHz Idx0 | 17.3 |
| n71_TX_136100CH RGI_56 | 28.3 | n71_TX_136100CH ET 20 MHz Idx1 | 19 |

TABLE 10-continued

| Full bias control | | ET control | |
|---|---|---|---|
| Sample | Power | Sample | Power |
| n71_TX_136100CH RGI_55 | 27.6 | n71_TX_136100CH ET 20 MHz Idx2 | 22.9 |
| n71_TX_136100CH RGI_54 | 26.9 | n71_TX_136100CH ET 20 MHz Idx3 | 26.9 |

TABLE 11

| Full bias control | | ET control | |
|---|---|---|---|
| Sample | Power | Sample | Power |
| n41_TX_501000CH RGI_60 | 28.5 | n41_TX_501000CH ET 50 MHz Idx0 | 16.6 |
| n41_TX_501000CH RGI_59 | 28.4 | n41_TX_501000CH ET 50 MHz Idx1 | 18.3 |
| n41_TX_501000CH RGI_58 | 28.3 | n41_TX_501000CH ET 50 MHz Idx2 | 20.8 |
| n41_TX_501000CH RGI_57 | 28.3 | n41_TX_501000CH ET 50 MHz Idx3 | 26.1 |

According to various embodiments, when the reference signal is transmitted, if maximum power of the ET mode or higher power is required to transmit the signal with higher power in the ET mode, full bias of the APT mode may operate. For example, referring to Table 7 to Table 11, when the operation with maximum power of the APT full bias is performed, the output may be 2 dBm higher than the maximum power of the ET mode. According to various embodiments, when power larger than the maximum power of the ET mode is required, the full bias mode of the ATP mode may operate. An electronic device according to one of the various embodiments may include a communication processor, at least one radio frequency integrated circuit (RFIC) connected to the communication processor, a first radio frequency front-end (RFFE) circuit connected to the at least one RFIC and configured to process a transmission signal, a second RFFE circuit connected to the at least one RFIC and configured to process a transmission signal, a first antenna group including a plurality of antennas connected through the first RFFE circuit and configured to transmit signals corresponding to at least one communication network, and a second antenna group including a plurality of antennas connected through the second RFFE circuit and configured to transmit signals corresponding to at least one communication network, wherein the communication processor is configured to perform control to transmit a reference signal referenced for channel estimation by a base station of a first communication network to at least one antenna of the plurality of antennas of the first antenna group through the first RFFE circuit and transmit the reference signal to at least one antenna of the plurality of antennas of the second antenna group through the second RFFE circuit.

According to various embodiments, the reference signal may include a sounding reference signal (SRS) used for multi-antenna signal processing through uplink channel state measurement, but is not limited thereto.

According to various embodiments, the communication processor may be configured to perform control to transmit antenna-related information to a base station of the first communication network.

According to various embodiments, when the first antenna group includes at least two antennas and the second antenna group includes at least two antennas, the antenna-related information may include information indicating that the electronic device supports one transmission antenna and four reception antennas.

According to various embodiments, the communication processor may be configured to receive information related to a transmission time point of the reference signal corresponding to each of the four reception antennas from the base station, and perform control to transmit a plurality of reference signals through a plurality of antennas corresponding to the first antenna group and a plurality of antennas corresponding to the second antenna group at different times, based on the received information related to the transmission time point of the reference signal.

According to various embodiments, the electronic device may further include a switch which can be selectively connected to the first RFFE circuit and the second RFFE circuit and is configured to selectively output an output signal of the first RFFE circuit and an output signal of the second RFFE circuit.

According to various embodiments, a path loss between the first RFFE circuit and a plurality of antennas of the second antenna group may be larger than a path loss between the second RFFE and a plurality of antennas of the second antenna group.

An electronic device according to one of the various embodiments may include a communication processor, at least one radio frequency integrated circuit (RFIC) connected to the communication processor, and a plurality of antennas connected to the at least one RFIC through at least one radio frequency front-end (RFFE) circuit and configured to transmit and receive a signal corresponding to at least one communication network, wherein the communication processor may be configured to perform control to transmit a transmission signal through at least one antenna among the plurality of antennas, based on first maximum transmission power configured for the electronic device, identify, when a reference signal referenced for channel estimation by the base station, second maximum transmission power configured to be larger than the first maximum transmission power for the transmission of the reference signal, and perform control to transmit the reference signal through at least one antenna among the plurality of antennas, based on the identified second maximum transmission power.

According to various embodiments, the reference signal may include a sounding reference signal (SRS) used for multi-antenna signal processing through uplink channel state measurement, but is not limited thereto.

According to various embodiments, the communication processor may perform control to transmit the reference signal through at least one antenna of the plurality of antennas, based on the identified second maximum transmission power and transmission target power.

Hereinafter, various embodiments in which the CP 260 or the RFIC 410 of the electronic device 101 controls transmission of the reference signal according to various embodiments are described in detail with reference to FIGS. 13 to 16.

FIGS. 13 to 16 are flowcharts illustrating a method of operating the electronic device according to various embodiments. The operations in FIGS. 13 to 16 described below may be applied to the electronic device of one of FIG. 4A, 4B, 4C, 5A, 5B, 6, 7, 8A, 8B, 9, or 10.

Figure 13:
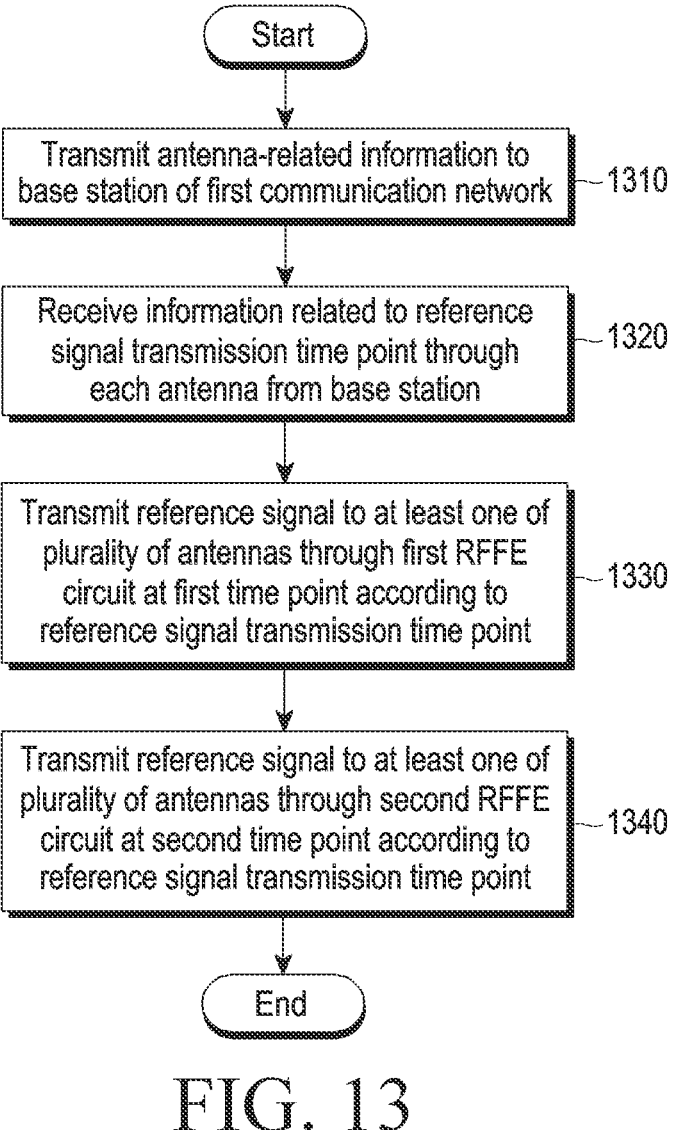
FIG. 13 is a flowchart illustrating a method of operating an electronic device according to an embodiment of the disclosure.

FIG. 13 is a flowchart illustrating a method of operating an electronic device according to an embodiment of the disclosure.

The electronic device (for example, the electronic device 101 of FIG. 1) may include the communication processor 260, at least one radio frequency integrated circuit (RFIC) 410 connected to the communication processor, and the plurality of antennas 441, 442, 443, 444, 831, 832, 833, and 834 connected to the at least one RFIC through at least one radio frequency front-end (RFFE) 431, 432, 811, and 821 and configured to transmit signals corresponding to at least one communication network.

Referring to FIG. 13, according to various embodiments, the electronic device 101 (for example, the communication processor 260 of the electronic device) may perform control to transmit antenna-related information to a base station of the first communication network in operation 1310. According to various embodiments, when a first antenna group of the electronic device includes two antennas and a second antenna group includes two antennas, the antenna-related information may include information indicating that the electronic device supports one transmission antenna and four reception antennas. The antenna-related information may be inserted into a UE capability information message and transmitted. The UE capability information message may include information related to reception antennas of the electronic device 101 corresponding to 'supportedSRS-Tx-PortSwitch t1r4' in accordance with the content of a UE capability enquiry message.

According to various embodiments, the electronic device may receive information on a time point at which the reference signal is transmitted from the base station through each antenna in operation 1320.

According to various embodiments, the electronic device may perform control to transmit the reference signal to at least one of the plurality of antennas (for example, the first antenna group) via the first RFFE circuit 431 or 811 at a first time point according to the reference signal transmission time point in operation 1330.

According to various embodiments, the electronic device may perform control to transmit the reference signal to at least one of the plurality of antennas (for example, the second antenna group) via the second RFFE circuit 432 or 821 at a second time point according to the reference signal transmission time point in operation 1340.

According to various embodiments, the reference signal may be transmitted at different times through the plurality of antennas. According to various embodiments, the reference signal may be a sounding reference signal (SRS) used for multi-antenna signal processing through uplink channel state measurement, but is not limited thereto.

Figure 14:
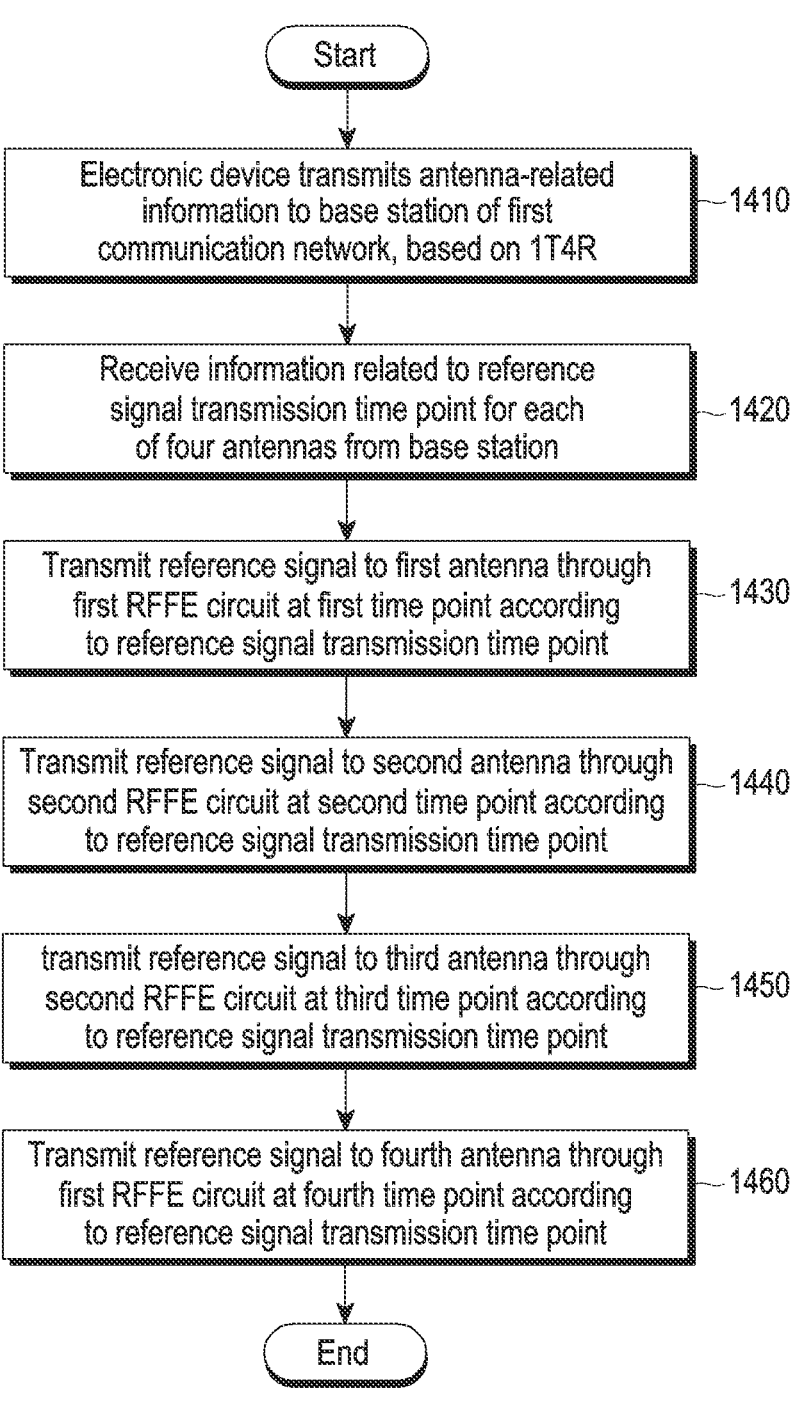
FIG. 14 is a flowchart illustrating a method of operating an electronic device according to an embodiment of the disclosure.

FIG. 14 is a flowchart illustrating a method of operating an electronic device according to an embodiment of the disclosure.

The electronic device (for example, the electronic device 101 of FIG. 1) may include the communication processor 260, at least one radio frequency integrated circuit (RFIC) 410 connected to the communication processor, and the plurality of antennas 441, 442, 443, 444, 831, 832, 833, and 834 connected to the at least one RFIC through at least one radio frequency front-end (RFFE) 431, 432, 811, and 821 and configured to transmit signals corresponding to at least one communication network.

Referring to FIG. 14, according to various embodiments, the electronic device 101 (for example, the communication processor 260 of the electronic device) may transmit antenna-related information to the base station of the first communication network on the basis of 1T4R in operation 1410. For example, the electronic device supporting 1T2R/2T4R or the electronic device supporting 1T4R/2T4R may transmit antenna-related information to the base station of the first communication network on the basis of 1T4R.

The antenna-related information may be inserted into a UE capability information message and transmitted. The UE capability information message may include information related to reception antennas of the electronic device 101 corresponding to 'supportedSRS-TxPortSwitch t1r4' in accordance with the content of a UE capability enquiry message.

According to various embodiments, the electronic device may receive information related to a time point at which the reference signal for each of the four antennas is transmitted from the base station in operation 1420.

According to various embodiments, the electronic device may perform control to transmit the reference signal to the first antenna through the first RFFE circuit at the first time point according to the reference signal transmission time point in operation 1430.

According to various embodiments, the electronic device may perform control to transmit the reference signal to the second antenna through the second RFFE circuit at the second time point according to the reference signal transmission time point in operation 1440.

According to various embodiments, the electronic device may perform control to transmit the reference signal to the third antenna through the second RFFE circuit at a third time point according to the reference signal transmission time point in operation 1450.

According to various embodiments, the electronic device may perform control to transmit the reference signal to the fourth antenna through the first RFFE circuit at a fourth time point according to the reference signal transmission time point in operation 1460.

Figure 15:
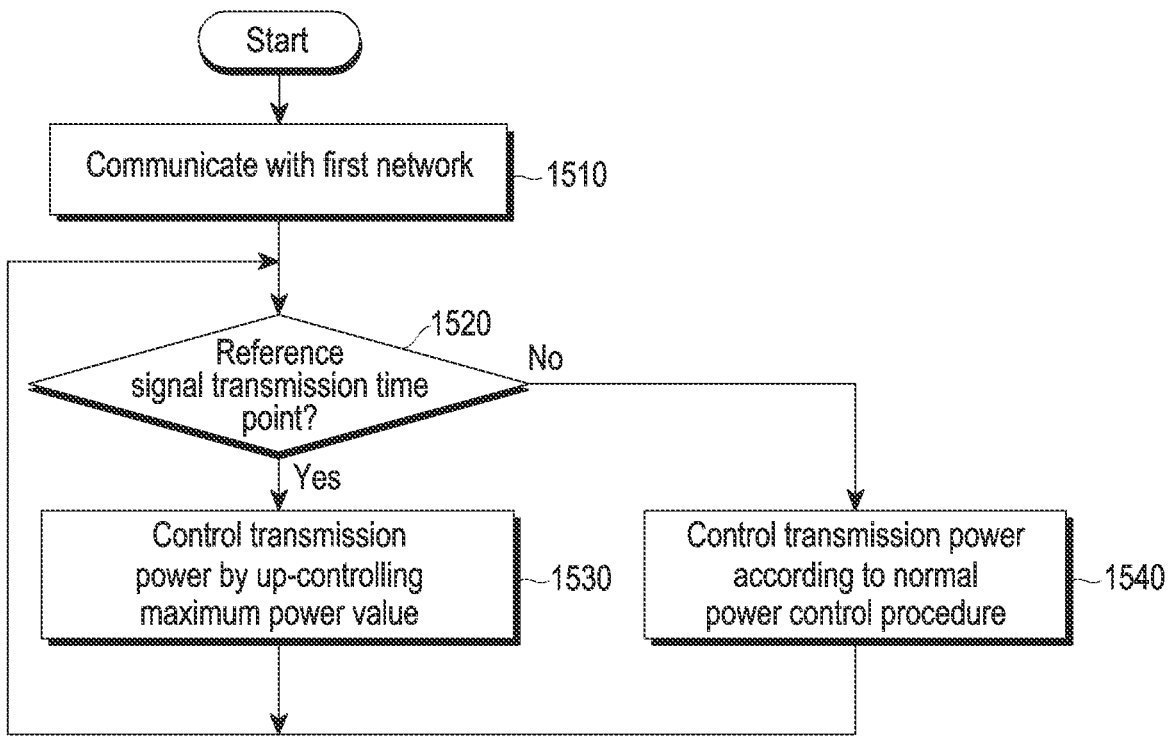
FIG. 15 is a flowchart illustrating a method of operating an electronic device according to an embodiment of the disclosure.

FIG. 15 is a flowchart illustrating a method of operating an electronic device according to an embodiment of the disclosure.

The electronic device (for example, the electronic device 101 of FIG. 1) may include the communication processor 260, at least one radio frequency integrated circuit (RFIC) 410 connected to the communication processor, and the plurality of antennas 441, 442, 443, 444, 831, 832, 833, and 834 connected to the at least one RFIC through at least one radio frequency front-end (RFFE) 431, 432, 811, and 821 and configured to transmit signals corresponding to at least one communication network.

Referring to FIG. 15, according to various embodiments, the electronic device 101 (for example, the communication processor 260 of the electronic device) may communicate with the first network in operation 1510. In operation 1520, it may be determined whether the current transmission time point is the reference signal transmission time point.

According to various embodiments, when the current transmission time point is not the reference signal transmission time point on the basis of the determination result (No of operation 1520), the maximum power value may be configured as the maximum power value (for example, 23 dBm) according to the normal power control procedure illustrated in FIGS. 11A and 11B to control transmission power of the transmission signal in operation 1540.

According to various embodiments, when the current transmission time point is the reference signal transmission time point on the basis of the determination result (Yes of operation 1520), the maximum power value may be up-controlled to the SRS maximum power (for example, 25.5 dBm) to control transmission power of the transmission signal (for example, reference signal) in operation 1530.

Figure 16:
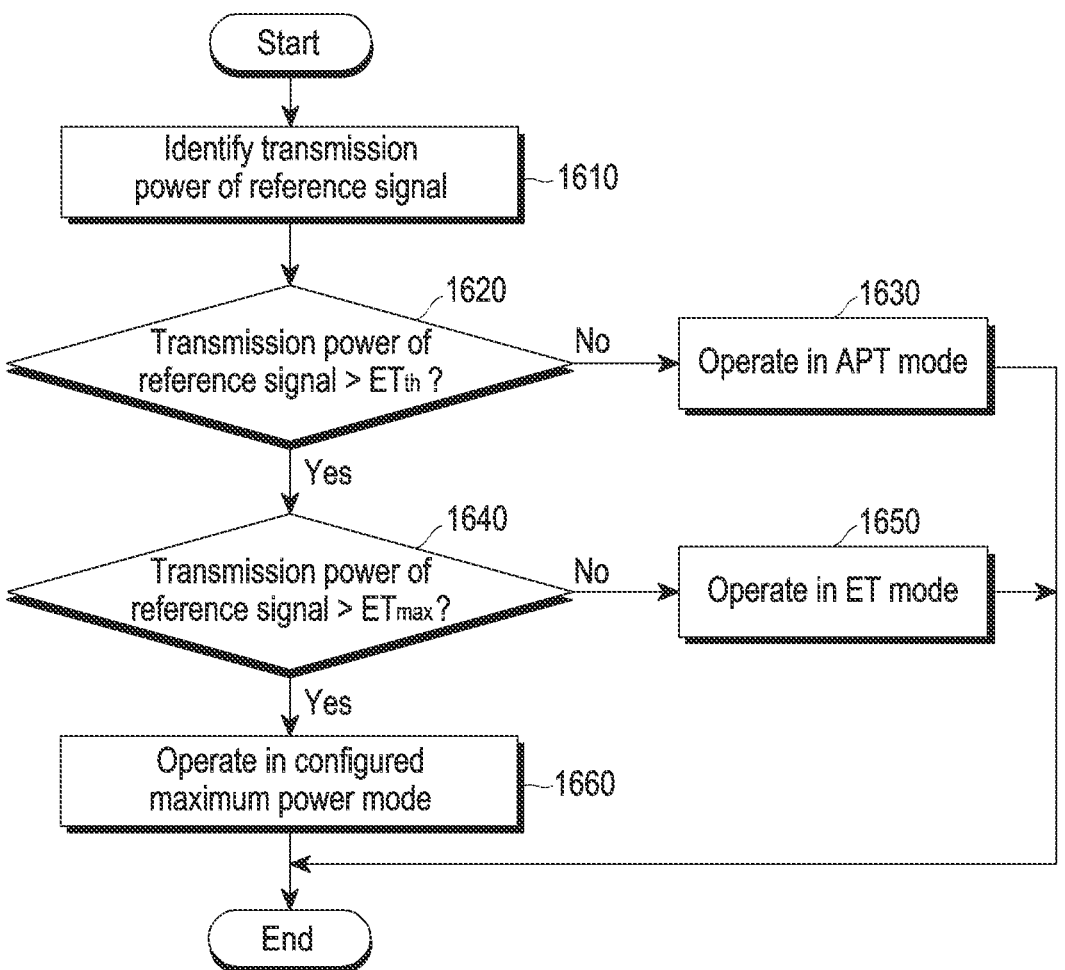
FIG. 16 is a flowchart illustrating a method of operating an electronic device according to an embodiment of the disclosure.

FIG. 16 is a flowchart illustrating a method of operating an electronic device according to an embodiment of the disclosure.

The electronic device (for example, the electronic device 101 of FIG. 1) may include the communication processor 260, at least one radio frequency integrated circuit (RFIC) 410 connected to the communication processor, and the plurality of antennas 441, 442, 443, 444, 831, 832, 833, and 834 connected to the at least one RFIC through at least one radio frequency front-end (RFFE) 431, 432, 811, and 821 and configured to transmit signals corresponding to at least one communication network.

Referring to FIG. 16, the electronic device 101 (for example, the communication processor 260 of the electronic device) may identify transmission power of the reference signal in operation 1610.

According to various embodiments, the electronic device may compare the transmission power of the reference signal with an ET threshold value ($ET_{th}$) in operation 1620. When the transmission power of the reference signal is smaller than (or smaller than or equal to) the ET threshold value ($ET_{th}$) (for example, 18 dBm) on the basis of the comparison result (No of operation 1620), the ATP mode may operate in operation 1630 as illustrated in FIG. 12B.

When the transmission power of the reference signal is larger than (or equal to or larger than) the ET threshold value ($ET_{th}$) (for example, 18 dBm) on the basis of the comparison result (Yes of operation 1620), the electronic device may compare the transmission power of the reference signal with an ET maximum value ($ET_{max}$) in operation 1640. When the transmission power of the reference signal is smaller than (or smaller than or equal to) the ET maximum value ($ET_{max}$) on the basis of the comparison result (No of operation 1640), the ET mode may operate in operation 1650 as illustrated in FIG. 12C.

According to various embodiments, when the transmission power of the reference signal is larger than (or larger than or equal to) the ET maximum value ($ET_{max}$) on the basis of the comparison result (Yes of operation 1640), the configured maximum power mode (for example, full bias of the AP mode) may operate in operation 1660. For example, when the electronic device operates with maximum power of APT full bias, the output may be 2 dBm higher than the maximum power of the ET mode. According to various embodiments, when power larger than the maximum power ($ET_{max}$) of the ET mode is required, the full bias mode of the APT mode may operate.

A method of transmitting a reference signal by an electronic device according to one of the various embodiments may include an operation of transmitting a reference signal referenced for channel estimation by a base station of a first communication network to at least one antenna of a plurality of antennas of a first antenna group through a first RFFE circuit, wherein the electronic device comprises a communication processor, at least one radio frequency integrated circuit (RFIC) connected to the communication processor, the first radio frequency front-end (RFFE) circuit connected to the at least one RFIC and configured to process a transmission signal, a second RFFE circuit connected to the at least one RFIC and configured to process a transmission signal, the first antenna group comprising the plurality of antennas connected through the first RFFE circuit and configured to transmit signals corresponding to at least one communication network, and a second antenna group comprising a plurality of antennas connected through the second RFFE circuit and configured to transmit signals corresponding to at least one communication network, and an operation of transmitting the reference signal to at least one antenna of the plurality of antennas of the second antenna group through the second RFFE circuit.

According to various embodiments, the reference signal may include a sounding reference signal (SRS) used for multi-antenna signal processing through uplink channel state measurement.

According to various embodiments, the method may further include an operation of transmitting antenna-related information to a base station of the first communication network.

According to various embodiments, when the first antenna group includes at least two antennas and the second antenna group includes at least two antennas, the antenna-related information may include information indicating that the electronic device supports one transmission antenna and four reception antennas.

According to various embodiments, the method may include an operation of receiving information related to a transmission time point of the reference signal corresponding to each of the four reception antennas from the base station and an operation of transmitting a plurality of reference signals through a plurality of antennas corresponding to the first antenna group and a plurality of antennas corresponding to the second antenna group at different times, based on the received information related to the transmission time point of the reference signal.

According to various embodiments, an output signal of the first RFFE circuit and an output signal of the second RFFE circuit may be selectively output through a switch.

According to various embodiments, a path loss between the first RFFE circuit and the plurality of antennas of the second antenna group may be larger than a path loss between the second RFFE and the plurality of antennas of the second antenna group.

A method of transmitting a reference signal by an electronic device according to one of the various embodiments may include an operation of transmitting a transmission signal through at least one antenna among a plurality of antennas, wherein the electronic device comprising at least one radio frequency integrated circuit (RFIC) connected to a communication processor and the plurality of antennas connected to the at least one RFIC through at least one radio frequency front-end (RFFE) circuit and configured to transmit and receive a signal corresponding to at least one communication network based on first maximum transmission power configured for the electronic device, an operation of, when a reference signal referenced for channel estimation by the base station, identifying second maximum transmission power configured to be larger than the first maximum transmission power for the transmission of the reference signal, and an operation of transmitting the reference signal through at least one antenna among the plurality of antennas, based on the identified second maximum transmission power.

According to various embodiments, the reference signal may include a sounding reference signal (SRS) used for multi-antenna signal processing through uplink channel state measurement, but is not limited thereto.

According to various embodiments, the reference signal may include a demodulation reference signal (DM-RS) for obtaining channel information for demodulation of uplink data.

According to various embodiments, the method may further include an operation of transmitting the reference signal through at least one antenna of the plurality of antennas, based on the identified second maximum transmission power and transmission target power.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication processor;
a radio frequency integrated circuit (RFIC) connected to the communication processor;
a first radio frequency front-end (RFFE) circuit connected to the RFIC and configured to process a first transmission signal;
a second RFFE circuit connected to the RFIC and configured to process a second transmission signal; and
a plurality of antennas including a first antenna, a second antenna, a third antenna, and a fourth antenna, each of the plurality of antennas connectable to at least one of the first RFFE circuit or the second RFFE circuit,
wherein the communication processor is configured to:
identify four transmission time points for transmitting a sounding reference signal (SRS), wherein an SRS is to be transmitted at each of the four transmission time points,
control to transmit, using the first RFFE circuit, an SRS through the first antenna at one of the two transmission time points and through the second antenna at another of the two transmission time points, and
control to transmit, using the second RFFE circuit, the SRS through the third antenna at yet another of the four transmission time points and through the fourth antenna at a remaining one of the four transmission time points, and
wherein the four transmission time points are different from each other.

2. The electronic device of claim 1, wherein the communication processor is further configured to control to transmit antenna-related information to a base station of a communication network.

3. The electronic device of claim 2,
wherein the antenna-related information comprises information indicating that the electronic device supports one transmission antenna and four reception antennas, and
wherein the communication processor is further configured to receive information related to a transmission time point of the SRS corresponding to each of the four reception antennas from the base station.

4. The electronic device of claim 3, wherein the communication processor is further configured to:
control to transmit a plurality of SRSs through the plurality of antennas at different times, based on the received information related to the transmission time point of the SRS.

5. The electronic device of claim 1, further comprising a switch configured to:
be selectively connected to the first RFFE circuit and the second RFFE circuit, and
selectively output an output signal of the first RFFE circuit and an output signal of the second RFFE circuit.

6. The electronic device of claim 5, wherein a path loss between the first RFFE circuit and the plurality of antennas is larger than a path loss between the second RFFE and the plurality of antennas.

7. The electronic device of claim 1, wherein the communication processor is further configured to:
control to transmit a transmission signal through at least one antenna among the plurality of antennas, based on first maximum transmission power configured for the electronic device,
identify, in case that a SRS is transmitted, second maximum transmission power configured to be larger than the first maximum transmission power for the transmission of the SRS, and
control to transmit the SRS through at least one antenna among the plurality of antennas, based on the identified second maximum transmission power.

8. The electronic device of claim 7, wherein the communication processor is further configured to:
transmit the SRS through at least one antenna of the plurality of antennas, based on the identified second maximum transmission power and transmission target power.

9. The electronic device of claim 1, wherein the SRS comprises a demodulation reference signal (DM-RS) for obtaining channel information for demodulation of uplink data.

10. A method of transmitting a reference signal by an electronic device, wherein the electronic device comprises a communication processor, a radio frequency integrated circuit (RFIC) connected to the communication processor, a first radio frequency front-end (RFFE) circuit connected to the RFIC and configured to process a first transmission signal, a second RFFE circuit connected to the RFIC and configured to process a second transmission signal, and a plurality of antennas including a first antenna, a second antenna, a third antenna, and a fourth antenna, each of the plurality of antennas connectable to at least one of the first RFFE circuit or the second RFFE circuit and configured to transmit signals corresponding to at least one communication network, the method comprising:
identifying four transmission time points for transmitting a sounding reference signal (SRS), wherein an SRS is to be transmitted at each of the four transmission time points;

transmitting, using the first RFFE circuit, an SRS through the first antenna at one of the four transmission time points and through the second antenna at another of the four transmission time points; and transmitting, using the second RFFE circuit, the SRS through the third antenna at yet another of the four transmission time points and through the fourth antenna at a remaining one of the four transmission time points, wherein the four transmission time points are different from each other.

11. The method of claim 10, further comprising:
transmitting antenna-related information to a base station of a communication network.

12. The method of claim 11,
wherein the antenna-related information comprises information indicating that the electronic device supports one transmission antenna and four reception antennas, and wherein the method further comprises receiving information related to a transmission time point of the SRS corresponding to each of the four reception antennas from the base station.

13. The method of claim 12, further comprising:
transmitting a plurality of SRSs through the plurality of antennas at different times, based on the received information related to the transmission time point of the SRS.

14. The method of claim 10, wherein an output signal of the first RFFE circuit and an output signal of the second RFFE circuit are selectively output through a switch.

15. The method of claim 14, wherein a path loss between the first RFFE circuit and the plurality of antennas is larger than a path loss between the second RFFE and the plurality of antennas.

16. The method of claim 10, further comprising:
controlling to transmit a transmission signal through at least one antenna among the plurality of antennas, based on first maximum transmission power configured for the electronic device, identifying, in case that a SRS is transmitted, second maximum transmission power configured to be larger than the first maximum transmission power for the transmission of the SRS, and controlling to transmit the SRS through at least one antenna among the plurality of antennas, based on the identified second maximum transmission power.

17. The method of claim 16, further comprising:
transmitting the SRS through at least one antenna of the plurality of antennas, based on the identified second maximum transmission power and transmission target power.

18. The method of claim 10, wherein the SRS comprises a demodulation reference signal (DM-RS) for obtaining channel information for demodulation of uplink data.

19. A communication processor for an electronic device, wherein the communication processor is configured to:
identify four transmission time points for transmitting a sounding reference signal, SRS, wherein an SRS is to be transmitted at each of the four transmission time points, control to transmit, using a first RFFE circuit of the electronic device, an SRS through a first antenna among a plurality of antennas of the electronic device at one of the four transmission time points and through a second antenna among the plurality of antennas at another of the four transmission time points, control to transmit, using a second RFFE circuit of the electronic device, the SRS through a third antenna among the plurality of antennas at yet another of the four transmission time points and through a fourth antenna among the plurality of antennas at a remaining one of the four transmission time points, wherein the four transmission time points are different from each other.

20. A method performed by a communication processor for controlling an electronic device comprising a radio frequency integrated circuit, RFIC, connected to the communication processor, a first radio frequency front-end, RFFE, circuit connected to the RFIC and configured to process a first transmission signal, a second RFFE circuit connected to the RFIC and configured to process a second transmission signal, and a plurality of antennas including a first antenna, a second antenna, a third antenna and a fourth antenna, each of the plurality of antennas connectable to at least one of the first RFFE circuit or the second RFFE circuit for transmitting a sounding reference signal, SRS, the method comprising:

identifying four transmission time points for transmitting the SRS;

transmitting, using the first RFFE circuit, a first SRS through the first antenna at one of the four transmission time points;

transmitting, using the second RFFE circuit, a second SRS through the second antenna at one of the four transmission time points;

transmitting, using the second RFFE circuit, a third SRS through the third antenna at one of the four transmission time points; and transmitting, using the first RFFE circuit, a fourth SRS through the fourth antenna at one of the four transmission time points, wherein the four transmission time points are different from each other, and each of the first SRS, the second SRS, the third SRS, and the fourth SRS is respectively transmitted at each of the four transmission time points.

* * * * *